(12) United States Patent
Ueda et al.

(10) Patent No.: US 7,481,289 B2
(45) Date of Patent: Jan. 27, 2009

(54) SWIVELING WORK MACHINE

(75) Inventors: Masaaki Ueda, Sakai (JP); Sakae Sugahara, Kawachinagano (JP)

(73) Assignee: Kubota Corporation, Osaka (JP)

( * ) Notice: Subject to any disclaimer, the term of this patent is extended or adjusted under 35 U.S.C. 154(b) by 493 days.

(21) Appl. No.: 11/069,914

(22) Filed: Mar. 1, 2005

(65) Prior Publication Data

US 2005/0210717 A1 Sep. 29, 2005

(30) Foreign Application Priority Data

Mar. 29, 2004 (JP) .............................. 2004-097036
Dec. 6, 2004 (JP) .............................. 2004-353232

(51) Int. Cl.
*B62D 33/08* (2006.01)
*B60N 3/08* (2006.01)
(52) U.S. Cl. ............... 180/89.16; 180/89.12; 180/89.13
(58) Field of Classification Search ............... 180/68.1,
180/89.16, 328, 326, 69.21, 333, 759, 757,
180/37, 89.12, 89.13, 89.113; 414/694, 918,
414/687; 296/102; 37/343, 347, 379, 410,
37/466
See application file for complete search history.

(56) References Cited

U.S. PATENT DOCUMENTS

| 3,679,256 | A | * | 7/1972 | Orns ........................... 296/102 |
| 3,995,891 | A | * | 12/1976 | Hoyt ........................... 296/102 |
| 4,736,647 | A | * | 4/1988 | Shimoie et al. ............. 180/333 |
| 4,771,855 | A | * | 9/1988 | Takashima et al. .......... 180/326 |
| 4,836,738 | A | * | 6/1989 | Nozaka et al. .............. 280/759 |
| 4,966,240 | A | * | 10/1990 | Aikawa ....................... 414/687 |
| 5,108,253 | A | * | 4/1992 | Kobayashi et al. .......... 414/694 |
| 5,671,820 | A | * | 9/1997 | Kobayashi et al. ......... 180/68.1 |
| 5,711,095 | A | * | 1/1998 | Oda et al. ...................... 37/410 |
| 5,715,615 | A | * | 2/1998 | Murakami et al. ............. 37/379 |
| 6,009,643 | A | * | 1/2000 | Maeba et al. ................. 37/443 |
| 6,170,180 | B1 | * | 1/2001 | Schaeff ......................... 37/443 |
| 6,170,588 | B1 | * | 1/2001 | Irino et al. .................. 180/89.1 |
| 6,430,852 | B2 | * | 8/2002 | Murakami .................... 37/466 |
| 6,540,036 | B1 | * | 4/2003 | Sugano ....................... 180/68.1 |
| 6,615,942 | B2 | * | 9/2003 | Shinohara et al. ......... 180/69.21 |
| 6,729,831 | B1 | * | 5/2004 | Kawamura et al. .......... 414/694 |

(Continued)

FOREIGN PATENT DOCUMENTS

EP 1 138 835 A 10/2001

(Continued)

OTHER PUBLICATIONS

Komatsu Ltd; "Equipment Mount Structure of Top Revolving Body in Hydraulic Shovel," Patent Abstracts of Japan, vol. 1998, No. 03, Feb. 27, 1998. Japan.

*Primary Examiner*—Hau V Phan
(74) *Attorney, Agent, or Firm*—The Webb Law Firm

(57) ABSTRACT

A swiveling work machine includes a swivel deck, an engine and an operator's seat which are mounted on the swivel deck and a protector for the operator's seat mounted erect on the swivel deck. The swivel deck mounts, at a rear portion thereof, a support frame having four post portions disposed around the engine. Two rear post portions of the support frame have upper ends thereof connected via a rear beam member. The rear beam member includes an attaching portion for the operator's seat protector to which portion the protector is attached.

12 Claims, 25 Drawing Sheets

U.S. PATENT DOCUMENTS

| | | | |
|---|---|---|---|
| 6,886,277 B2 * | 5/2005 | Yukawa et al. | 37/347 |
| 6,922,925 B2 * | 8/2005 | Watanabe et al. | 180/68.1 |
| 6,990,757 B2 * | 1/2006 | Takemura et al. | 37/347 |
| 7,021,074 B2 * | 4/2006 | Hara et al. | 62/244 |
| 7,188,865 B2 * | 3/2007 | Sugiyama et al. | 280/759 |
| 2003/0226293 A1 * | 12/2003 | Takemura et al. | 37/466 |

FOREIGN PATENT DOCUMENTS

| | | |
|---|---|---|
| JP | 08-184075 | 7/1996 |
| JP | 09-195316 | 7/1997 |
| JP | 09 296481 A | 11/1997 |
| JP | 11-081378 | 3/1999 |
| JP | 2001303618 | 10/2001 |
| JP | 2002194768 | 7/2002 |
| JP | 2003074085 | 3/2003 |
| JP | 2003112579 | 4/2003 |
| JP | 2003312538 | 11/2003 |
| WO | WO 2005/035341 A | 4/2005 |

* cited by examiner

SWIVELING WORK MACHINE

BACKGROUND OF THE INVENTION

1. Field of the Invention

The present invention relates to a swiveling work machine such as a backhoe.

2. Description of the Related Art

According to a conventional machine of the above type, an engine is mounted at a rear portion of a swivel deck and a radiator is disposed on either right or left side of the engine. And, across and over these components, there is disposed a support frame which mounts therein an air cleaner and a muffler (see e.g. Japanese Patent Application "Kokai" No. 11-81378).

There is also known a construction wherein a support frame having a rectangular shape in its plan view is mounted forwardly of an engine, the support frame supports an operator's seat and right and left implements controllers, and a canopy (an example of an "operator's seat protector") is attached to a rear portion of the support frame (see e.g. Japanese Patent Application "Kokai" No. 9-195316).

An operator's seat protector is known also from Japanese Patent Application "Kokai" No. 8-184075, which comprises a four-post construction having four post portions disposed at front and rear portions of a frame of a swivel deck.

In the case of the Japanese Patent Application "Kokai" No. 11-81378 mentioned first above, the support frame comprises a three-post construction having two front post portions and one rear post portion. This frame has only one beam at the fore and aft center thereof. Hence, this is not provided as a high-strength frame construction. In the case of the support frame known from the Japanese Patent Application "Kokai" No. 9-195316 mentioned second above, the frame has four post portions and has a rectangular shape in its plan view. Hence, this is a frame construction sturdy enough to support the operator's seat and the right and left implement controllers. However, this construction does not contribute significantly to attaching strength of the operator's seat protector.

In the case of the Japanese Patent Application "Kokai" No. 8-184075 method third above, the front and rear post portions of the four-post type operator's seat protector are affixed directly to the swivel deck frame, the rear post portions of the protector not being supported to any other support frame on the swivel deck.

That is, with these conventional techniques, in disposing the operator's seat protector in the vicinity of the engine in order to form the swivel deck compact, it is difficult to support the operator's seat protector with greater strength.

In view of the above, the present invention has been made to provide a swiveling work machine capable of solving the above-described problems of the conventional techniques.

Namely, a primary object of the present invention is to provide a swiveling work machine which is capable of increasing the strength of the support frame, mounting the operator's seat protector with greater strength and forming an upper structure of a swivel deck compact.

SUMMARY OF THE INVENTION

For accomplishing the above-noted object, according to the present invention, a swiveling work machine comprises:
a swivel deck;
an engine and an operator's seat which are mounted on the swivel deck; and
a protector for the operator's seat mounted erect on the swivel deck;
wherein the swivel deck mounts, at a rear portion thereof, a support frame having four post portions disposed around the engine;
two rear post portions of the support frame have upper ends thereof connected via a rear beam member; and
said rear beam member includes an attaching portion for the operator's seat protector to which portion the protector is attached.

With the above-described construction, by using the support frame which is constructed as a high-strength frame of a four-post type, the operator's seat protector can be firmly attached. Further, as this operator's seat protector is mounted erect adjacent the engine, the upper structure of the swivel deck can be formed compact. Preferably, this support frame has a rectangular shape in plan view.

According to one preferred embodiment of the present invention, the operator's seat protector is constructed as a four-post type having right and left front post portions and right and left rear post portions, with the right and left rear support post portions being attached to said attaching portion, said right and left front post portions being attached to right and left front portions of the swivel deck.

With the above construction, the four-post type operator's seat protector can be attached even more strongly by using the support frame for supporting/attaching the right and left rear post portions and using the right and left front portions of the swivel deck for supporting/attaching the front post portions.

Preferably, the operator's seat protector further includes a pair of right and left upper beam portions which connect upper ends of said respective front post portions with upper ends of said respective rear post portions and mount a roof member thereon, a front lower connecting portion for connecting lower portions of the right and left front post portions, and a rear lower connecting portion for connecting lower portions of the right and left rear post portions; and at said rear lower connecting portion, there is provided an attaching bracket to be attached to said attaching portion. In the case of the operator's seat protector having the above construction, the right and left front post portions are interconnected at the lower portions thereof by the front lower connecting portion, and the right and left rear post portions are interconnected at the lower portions thereof by the rear lower connecting portion. Hence, the frame structure of the protector per se can be formed sturdy.

Preferably, said rear lower connecting portion, the right and left rear post portions and respective latter halves of the right and left upper beam portions of the operator's seat protector are formed by bending a single pipe; a former half of said each upper beam portion and said each front post portion are formed of a single pipe, respectively; and the former half and the latter half of said each upper beam portion is connected via a connecting member. With this construction, the rear frame structure portion of the operator's seat protector can be formed as a structure free from welded portions, hence capable of avoiding stress concentration. Also, the front side of the protector can be manufactured easily.

Still preferably, the operator's seat is mounted at an upper portion of the support frame; said rear lower connecting portion of the operator's seat protector is disposed rearwardly of the operator's seat; and a lower portion of at least one of the rear post portions extends from the rear side of the driver's seat to a lateral side thereof. With this construction, intermediate portions of the right and/or left rear post portions of the operator's seat protector can be utilized for providing protection on the lateral sides of the driver's seat and providing e.g. handrails for the operator.

According to one preferred embodiment of the present invention, a radiator is disposed on either right or left side of the support frame; an air cleaner and a muffler are mounted inside the support frame; and the swivel deck includes a support portion to which the support frame is detachably attached from above the engine.

With this construction, the attachment and detachment of the support frame and the operator's seat protector relative to the swivel deck can be carried out easily. Further, the air cleaner and the muffler can be assembled in advance with the support frame, independently of the swivel deck which mounts the engine. Therefore, the mounting operations of the support frame and other vehicle components inside the engine room can be carried out very easily.

Preferably, the support frame includes, at a front upper portion thereof, an attaching portion for the operator's seat and includes also, at a rear upper portion thereof, said attaching portion. With this, the attaching portions for the operator's seat and the operator's seat protector can be easily formed and the seat and the protector can be supported reliably also.

Still preferably, the support frame includes, at right and left upper portions thereof, attaching portions for right and left implement controllers. With this construction, the right and left implement controllers can be attached to and assembled with the support frame in advance. Hence, the rear upper portion of the swivel deck can be assembled very easily.

Still preferably, the support frame includes a support stay projecting from a lateral upper portion thereof to be connected with an upper portion of the radiator. With this construction, the radiator can be supported easily and reliably.

Further and other features and advantages of the invention will become apparent upon reading the following detailed description of the preferred embodiments thereof with reference to the accompanying drawings.

DESCRIPTION OF THE PREFERRED EMBODIMENTS

Figure 1:
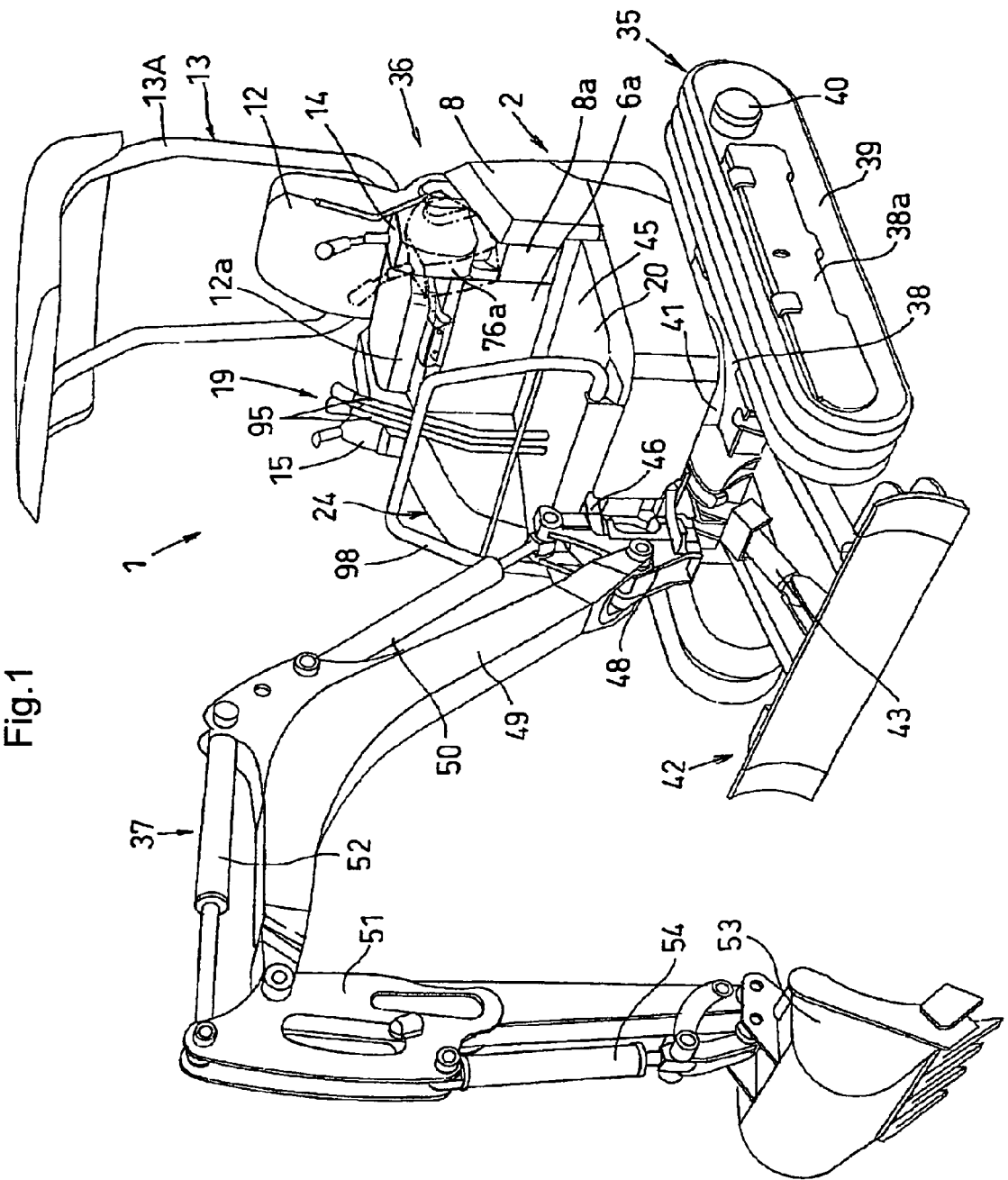
FIG. 1 is a left-front perspective view showing an entire swiveling work machine according to a first embodiment of the present invention.
Figure 2:
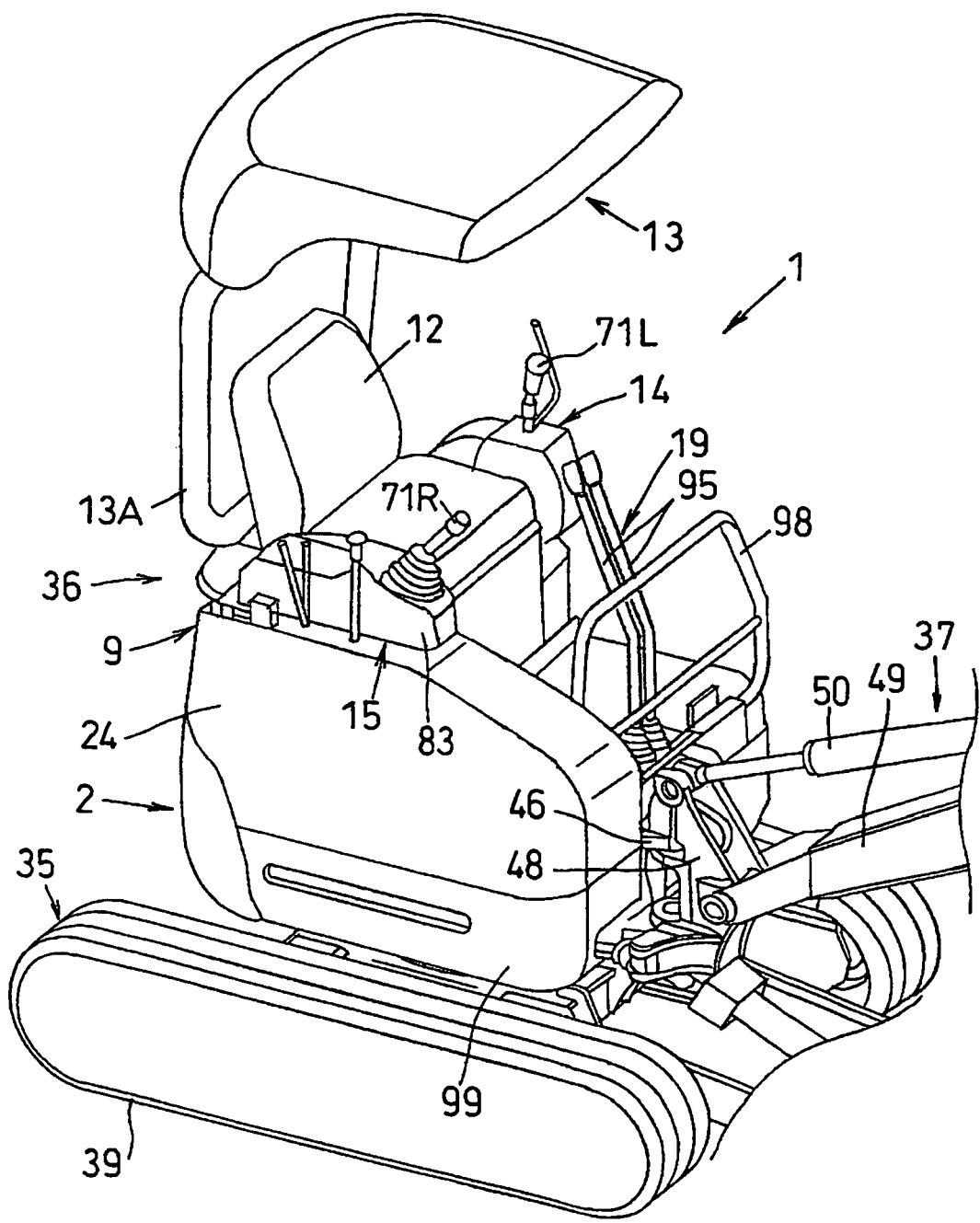
FIG. 2 is a right-front perspective view of the machine.

Preferred embodiments of a swiveling work machine relating to the present invention will be described in details with reference to the accompanying drawings.

First Embodiment

In FIGS. 1 through 12, numeral 1 denotes a standard or rear small-swiveling type backhoe as an example of a swiveling work machine. This backhoe 1 includes a pair of crawler traveling units 35, an upper structure 36 having a swivel deck 2, an excavator 37 mounted on the swivel deck 2 and a dozer implement 42 provided forwardly of the crawler traveling units 35.

Each crawler traveling unit 35 includes a drive wheel and a driven wheel rotatably supported to front and rear portions of a right or left side frame 38a of a track frame 38, a plurality of free wheels disposed between the drive and driven wheels and a crawler 39 formed of rubber or iron entrained about these wheels, with the drive wheel being driven to rotate by a traveling drive source such as a right or left traveling motor 40.

The track frame 38 supports the right and left side frames 38a with allowing mutual displacement therebetween along a right/left direction by means of a hydraulic cylinder. Hence, these right and left crawler units 35 are constructed as an inter-track distance variable type which allows increase or decrease of the inter-track distance between the right and left tracks thereof.

When the crawler traveling units 35 are set to the largest inter-track distance, a distance L1 from a swivel axis X (shown in FIGS. 6, 7 and 11) to the outer side of the right/left crawler traveling unit 35 under this condition is substantially same as or slightly longer (by e.g. about 10%) than the maximum radius of the swivel deck 2.

On the other hand, when the crawler traveling units 35 are set to the smallest inter-track distance, a distance L2 from the swivel axis X to the outer side of the right/left crawler traveling unit 35 under this condition is substantially same as or slightly longer (by e.g. about 10%) than a distance from the swivel axis X to each right or left side face of the swivel deck 2 which assumes a forward orientation.

The track frame 38 mounts thereon the swivel deck 2 via a swivel bearing 41. The swivel deck 2 can be swiveled to the right or left about the swivel axis X by means of a swivel motor 44. To the front portion of the track frame 38, the dozer implement 42 is vertically pivotally attached via a dozer cylinder 43.

In FIGS. 1-14, the swivel deck 2 mounts thereon such components as an engine 3, a radiator 5, a hydraulic pump 21 driven by the engine 3, a working fluid tank 22, a fuel tank 23, a cover unit 9 covering these components, an operator's seat 12 and right and left implement controllers 14, 15 which are disposed upwardly of the cover unit 9, and a traveling controller 19 disposed forwardly of the operators seat 12, etc. These components together constitute the upper structure 36.

A portion of the swivel deck 2 forwardly of the operator's seat 12 is constructed as an operator's access step 45. Also, at a front portion of the swivel deck 2, there is attached a swing bracket 48 of the excavator 37 via a receiving bracket 46, with the bracket 48 of the excavator 37 being pivotable about a vertical shaft 47.

In the excavator 37, the swing bracket 48 supported to the receiving bracket 46 via the vertical shaft 47 is pivotable to the right or left by means of a swing cylinder. To this swing bracket 48, respective base ends of a boom 49 and a boom cylinder 50 are pivoted via horizontal shafts to be lifted up/down. To a leading end of the boom 49, an arm 51 is pivoted to be vertically pivotable by an arm cylinder 52. To a leading end of the arm 51, a bucket (implement) 53 is pivoted to be operable by a bucket cylinder 54 for a scooping/dumping operation.

The receiving bracket 46, as shown in FIGS. 6, 7 and 10-14, projects forwardly from the front face (extreme front end) of the swivel deck 2 on the front side of the traveling controller 19. The traveling controller 19 and the operator's seat 12 are disposed with an offset to one of right and left sides (offset to the left side) from a centerline extending through the swivel axis X, whereas the receiving bracket 46 is disposed with an offset to the other of the right and left sides (offset to the right side).

The plan view shape of the swivel deck 2 is substantially front-square and back-round shape having a straight front face, parallel right and left side faces and an arcuate rear face. A distance from the swivel axis X of the swivel deck 2 to the leading end of the receiving bracket 46 or to the vertical shaft 47 is substantially same as or shorter than a distance from the swivel axis X to the rear end of the swivel deck 2. Preferably, these distances should be substantially same as or smaller than the distance from the swivel axis X to the outer end of the crawler 39 when the crawler traveling units 35 are set to the largest inter-track distance.

As this swiveling work machine 1 is compact, the area of the swivel deck 2 is extremely small, with the front face of the operator's seat 12 being disposed at substantially same position as the swivel axis X.

As shown in FIGS. 9-14, referring to the construction of the swivel deck 2, on a base plate 2A acting as a base of the deck, there are disposed erect a pair of right and left vertical walls 57 flared rearward from the receiving bracket 46 disposed forwardly. At an intermediate portion of the base plate 2A, there is disposed erect a partitioning wall 58 extending across the right and left vertical walls 57. Further, at a rear portion of the base plate 2A, there is disposed erect a receiving wall 59 connected to respective rear ends of the right and left vertical walls 57. At an intermediate potion and a peripheral portion, there are disposed erect attaching stays for attaching various vehicle components and a periphery cover on the base plate 2A.

At a rear potion of the base plate 2A, the engine 3 is mounted with a lateral orientation as being fitted among the partitioning wall 58 and the right and left receiving walls 59.

And, across and over this engine 3, there is mounted a support frame 4 having four support posts or post portions. At a rear end of the base plate, there is mounted an arcuate counter weight 56 attached via the right and left receiving walls 59.

Referring to the configuration of the support frame 4, an upper portion and a front portion thereof are formed rectangular, whereas right and left side portions and a rear portion thereof are formed portal. Front right and left post portions 4A, 4B are connected at lower portions thereof by an attachment plate 60A and are detachably bolt-fixed via this attachment plate 60A to an upper face of the partitioning wall 58.

Rear right and left post portions 4C, 4D of the support frame 4 also include an attachment plate 60B at lower ends thereof and are detachably bolt-fixed via the plate 60B to the right and left receiving walls 59.

To an upper portion of the partitioning wall 68, a plate member is affixed for forming a support portion 18A for receiving and supporting the attachment plate 60A. Similarly, to upper portions of the right and left receiving walls 59, a plate member is affixed for forming a support portion 18B for receiving and supporting the attachment plate 60B. With these support portions 18A 18B, the support frame 4 can be attached to and detached from the base plate 2A from above, with the base plate 2A mounting the engine 3 thereon. As the vehicle components present around the engine 3 are supported to the support frame 4, there is no obstacle which may interfere with the fitting of the support frame 4 over the engine 3.

The support frame 4 includes a pair of right and left portal members each comprising an L-shaped plate and a strip member affixed thereto, thereby to form the front right and left post portions 4A, 4B, the rear right and left post portions 4C, 4D and upper right and left side portions 4E, 4F. The attachment plate 60A is affixed to front lower ends of the right and left post portions 4A, 4B of the two portal members. Also, a front beam member (front upper beam) 61 comprising a strip plate or a strip plate bent arcuate in its cross section is affixed to the upper ends of the front right and left post portions 4A, 4B. Further, a rear beam member (rear upper beam) 62 formed of a thick plate is affixed to the rear upper portions of the right and left side portions 4E, 4F. Hence, the support frame 4 as a whole forms an outer frame of the engine room.

The front beam member 61 forms an attaching portion 61a for attaching a pivot member 63 for supporting the front of the operator's seat 12 to be pivotable about a horizontal axis. The rear beam member 62 forms an attaching portion (post portion attaching portion) 62a for attaching a post portion 13A of a canopy type operator's seat protector 13. Incidentally, this operator's seat protector can be constructed as a ROPS (rollover protection system) also.

The operator's seat 12 is constructed such that its rear portion is mounted and supported to the right and left side portions 4E, 4F or the rear beam member 62. A substantially entire area of the seat 12 is located above the support frame 4 and the engine 3 and the entire load thereof is supported by the support frame 4. Since the support frame 4 is constructed as the four-post type, this frame can provide high strength and can firmly support the operator's seat 12 and the operator's seat protector 13.

When the operator's seat protector 13 is attached to the attaching portion 62a, its lower portion is located adjacent the engine 3, in particular, rearwardly of the engine 3 disposed at the extreme rear end. Since the operator's seat protector 13 is located adjacent the operator's seat 12 of course, the upper structure of the swivel deck 2 including the operator's seat protector 13 can be formed short in the fore and aft direction, hence, formed compact.

To the support frame 4, a fixed cover 6 is fixed for covering the front face and the upper face of the frame 4. This fixed cover 6 is formed of an L-shaped (in side view) plate member (or two plates including a front plate and an upper plate). And, the cover 6 is bolt-fixed to the front right and left post portions 4A, 4B, the front beam member 61 provided in the upper face and the right and left side portions 4E, 4F of the support frame 4 and the cover is engaged with the rear beam member 62 to be fastened therewith to the operator's seat protector 13.

An upper portion of the fixed over 6 is retracted into the support frame 4 and an upper inspection window 90 is formed at this retracted portion. This upper inspection window 90 is closed with an upper lid. A front portion of the cover 6 is also retracted into the support frame 4 and a font inspection window 91 is formed at this retracted portion. This front inspection window 91 is closed with a front cover.

In FIGS. 9-12 and 21, the right side portion 4F of the support frame 4 includes an upper wind guide plate 29A inclined downwardly to the right outer side. The right post portion 4B includes a front wind guide plate 29B inclined rearwardly to the right outer side. So that, hot air from a radiator fan is guided downwardly toward to right rear side.

Further, between the fixed cover 6 and the right post portion 4B of the support frame 4 and also between the cover 6 and the right side portion 4F thereof, there is interposed a seal member 28 for preventing leakage of the hot air or noise toward the operator's seat 12 through the gaps therebetween before the air is guided to the upper wind guide plate 29A and the front wind guide plate 29B.

The two guide plates (i.e. the upper wind guide plate 29A and the front wind guide plate 29B) are formed of e.g. sheet metal. Instead of these plates or in addition to these plates, a seal member may be interposed between the right edge of the fixed cover 6 and the members present on the side thereof, for preventing leakage of hot air toward the operator's seat 12.

Inside the support frame 4, within the space delimited with the engine 3, an air cleaner 10, a muffler 11, an oil filter 92, a reserve tank 93 and other vehicle components are disposed and these are attached to the support frame 4 per se. The support frame 4 assembled in advance with some of these components can be attached to and detached from the base plate 2A from above the engine 3.

On one of the right and left side (right side) of the engine 3, there is disposed the hydraulic pump 21 driven by the engine and on the other side of the engine 3 (left side, on the side of the operator's entrance/exit), the radiator 5 and the radiator fan are disposed. On the outer side of the radiator 5, such components as an oil cooler 64, a battery 65, etc. are disposed. These components are mounted on the base plate 2A, separately from the support frame 4.

The radiator 5 is constructed as an air intake type and mounted on the base plate 2A adjacent the left side face of the support frame 4. And, an upper portion of the radiator 5 is fixedly connected via a bracket 16B to a support stay 16A projecting to the outer side from the left side portion 4E.

Further, as shown in FIGS. 14-18, a plurality of stays 66 formed of plates or bars project to the outer side from the left side portion 4E. Via these stays 66, a base 14a of the left implement controller 14 is fixed. The base 14a is disposed on the left outer side of the radiator 5 and pivotally supports via a pivot shaft 70a a lower pivot 70 of a unit frame 69 of the left implement controller 14.

An upper portion of the unit frame 69 is formed as a box-like member elongated in the fore and aft direction and forms a lower pivot portion formed narrow along the fore and aft direction and supported to the pivot shaft 70a. On the pivot shaft 70a, there is engaged an urging means (coil spring) for urging the left implement controller 14 toward a retracted posture raised from a control posture.

Referring to the left implement controller 14, a pilot valve 72L operable by a left control lever 71L is attached to an upper portion of the unit frame 69, and there is provided a posture changing means 74 operable by a posture changing lever 73.

The posture changing lever 73 is fixed to an end of a lever shaft 73a pivoted to an upper portion of the box of the unit frame 69. To the other end of the lever shaft 73a, there is fixed a cam 77 having a cam groove 77a. This cam groove 77a of the cam 77 is engaged with a cam follower 78 provided on the base 14a.

At a deep portion of the cam groove 77a, an engaging recess 77b is formed. In operation, in response to a shift of the left implement controller 14 from the retracted posture (shown with a solid line in FIGS. 6 and 7) to a control posture (shown with a dashed line in FIGS. 6 and 7), the unit frame 69 is pivoted about the pivot shaft 70a so that via the posture changing lever 73, the cam 77 is moved relative to the cam follower 78 and the cam follower 78 is moved to the deeper side of the cam groove 77a, then, the engaging recess 77b comes into engagement with the cam follower 78, thereby to retain the left implement controller 14 at the control posture. Under this control posture, the engagement between the engaging recess 77b and the cam follower 78 is maintained by the urging member 17 provided to the posture changing lever 73.

For changing the control posture to the retracted posture, the posture changing lever 73 is pivoted upward against the urging force of the urging member 17. With this, the engaging recess 77b is disengaged from the cam follower 78, thereby to release the posture maintenance by the posture changing lever 73. As the operator further pivots the posture changing lever 73, the left implement controller 14 is pivoted upward together therewith.

The urging member 17 which provides the rotational force to the cam 77 for engaging the engaging recess 77b with the cam follower 78 is disposed between the posture changing lever 73 and a rear portion of the box-like upper portion of the unit frame 69. As the urging member 17 is disposed not along the vertical direction, but along the fore and aft direction at the box-like upper portion of the unit frame 69, the lower pivot 70 is formed narrow along the fore and aft direction to be disposed inside a side cover 8.

The side cover 8 is disposed on the left outer side of the radiator 5, the oil cooler 64 and the battery 65 for covering these. The side cover 8 is detachably attached to the base plate 2A and the support frame 4. This side cover 8 has an ambient air inlet window and engages with a lower portion of the left implement controller 14 for covering the pivot shaft 70a and the lower pivot portion 70.

As shown in FIGS. 3, 5-7, 10 and 12, the side cover 8 is open at its upper portion for accommodating the lower pivot 70 of the left implement controller 14 therein and covering this lower pivot 70. Further, as the left implement controller 14 is disposed as close as possible to the left side face of the swivel deck 2, the swivel deck 2 is formed compact in the right/left direction.

The side cover 8 is disposed such that its front face 8a is disposed substantially flush with the front face 6a of the fixed cover 6. And, this cover 8 is supported via a vertical shaft (hinge) 79 to the left front post portion 4A (or the partitioning wall 58 raised from the base plate 2A) of the support frame 4, so that the cover can be pivotally opened/closed. Further, a rear end of the side cover 8 is disposed adjacent the left end of a hood cover 7.

Further, in this left implement controller 14, the unit frame 69 includes a cover 76. And, the controller 14 with this cover 76 is arranged such that under the retracted posture, its front face (the front face of the left implement controller 14) 76a is disposed substantially flush with the front face 8a of the side cover 8 and the front face 6a of the fixed cover 6 (i.e. at a same position in the fore and aft direction). And, a front face 12a of the operator's seat 12 too is disposed substantially flush with these.

Incidentally, any one or two of the fixed cover 6, the side cover 8, the operator's seat 12 and the left implement controller 14 may be displaced in the fore and aft direction relative to the others. In doing this, rearward displacement is preferred to forward displacement. If the front face 8a of the side cover 8 and the front face 6a of the fixed cover 6 which comprise erect walls on the back side of the operator's access step 45 are disposed substantially flush each other, the operator's access step 45 can have a large area for facilitating the operator's passage or movement from an entrance/exit 20 to the operator's seat 12.

As shown in FIGS. 3, 12, 19 and 20, the right rear post portion 4D of the support frame 4 is disposed on the right rear side of the engine 3 opposite to the side of the entrance/exit 20 and the radiator 5. This right rear post portion 4D pivotally supports a right end of the hood cover 7 via a vertical shaft (hinge) 82, so that the right end of the cover can be pivotally opened/closed.

Whereas, the left end (free end edge) of the hood cover 7 is disposed adjacent a rear end (free end edge) of the side cover 8, so that the left end can be superposed thereon from the outer side via an edge seal member 32. By locking the cover with a lock provided between this cover and the counter weight 31 provided at the rear end of the swivel deck 2, inadvertent opening of the side cover 8 can be prevented also.

The plan view shape of the hood cover 7 is an arcuate shape approximating the rear shape of the counter weight 31. And, along its peripheral edge, an edge seal member 32 is provided for sealing gaps between the rear end of the side cover 8, the rear beam member 62 of the support frame 4 and the counter weight 31, so as to prevent leak of hot air and/or noise inside the engine room through the hood cover 7.

Figure 3:
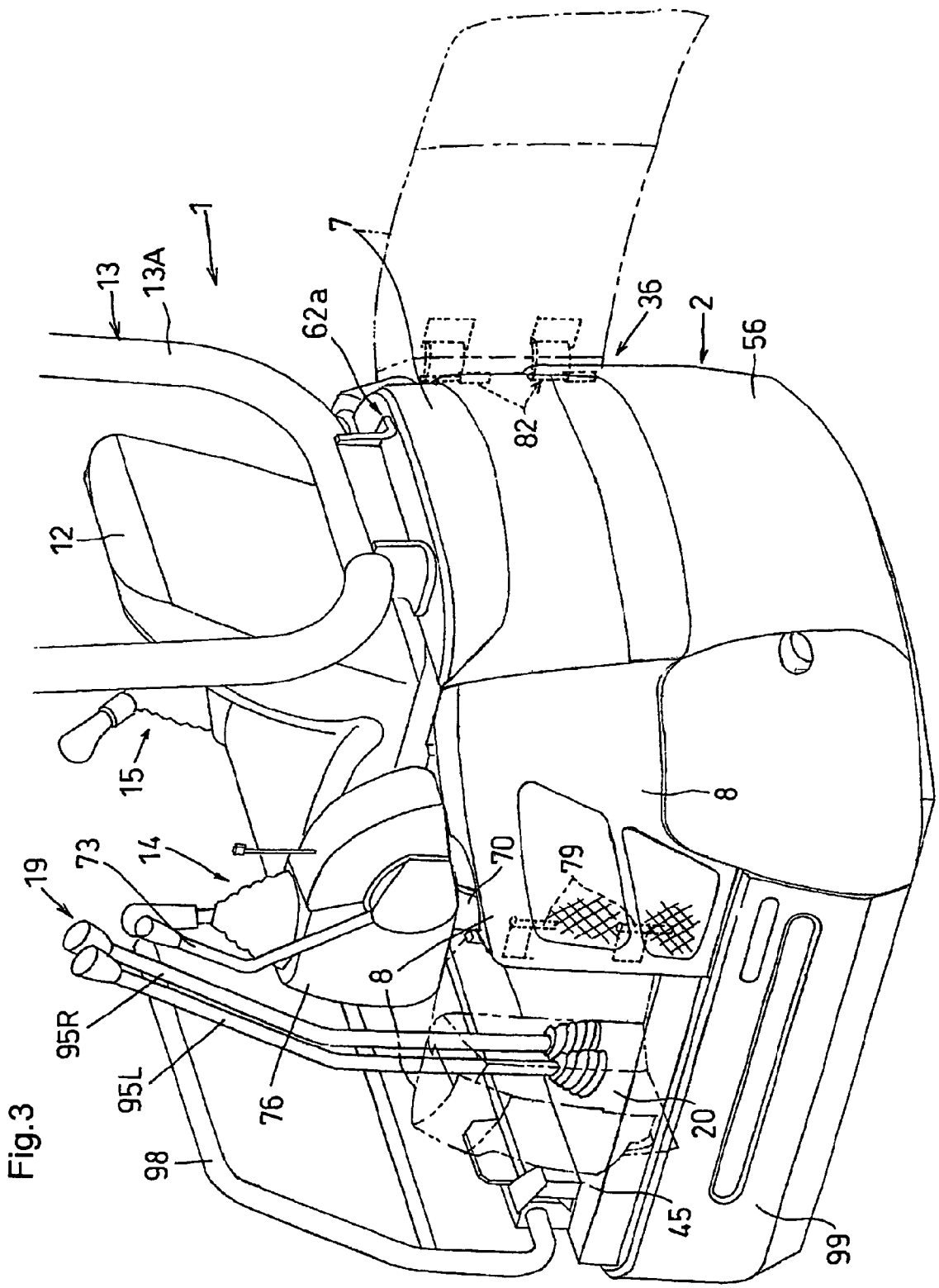
FIG. 3 is a left-rear perspective view of an upper structure of the swiveling work machine.
Figure 4:
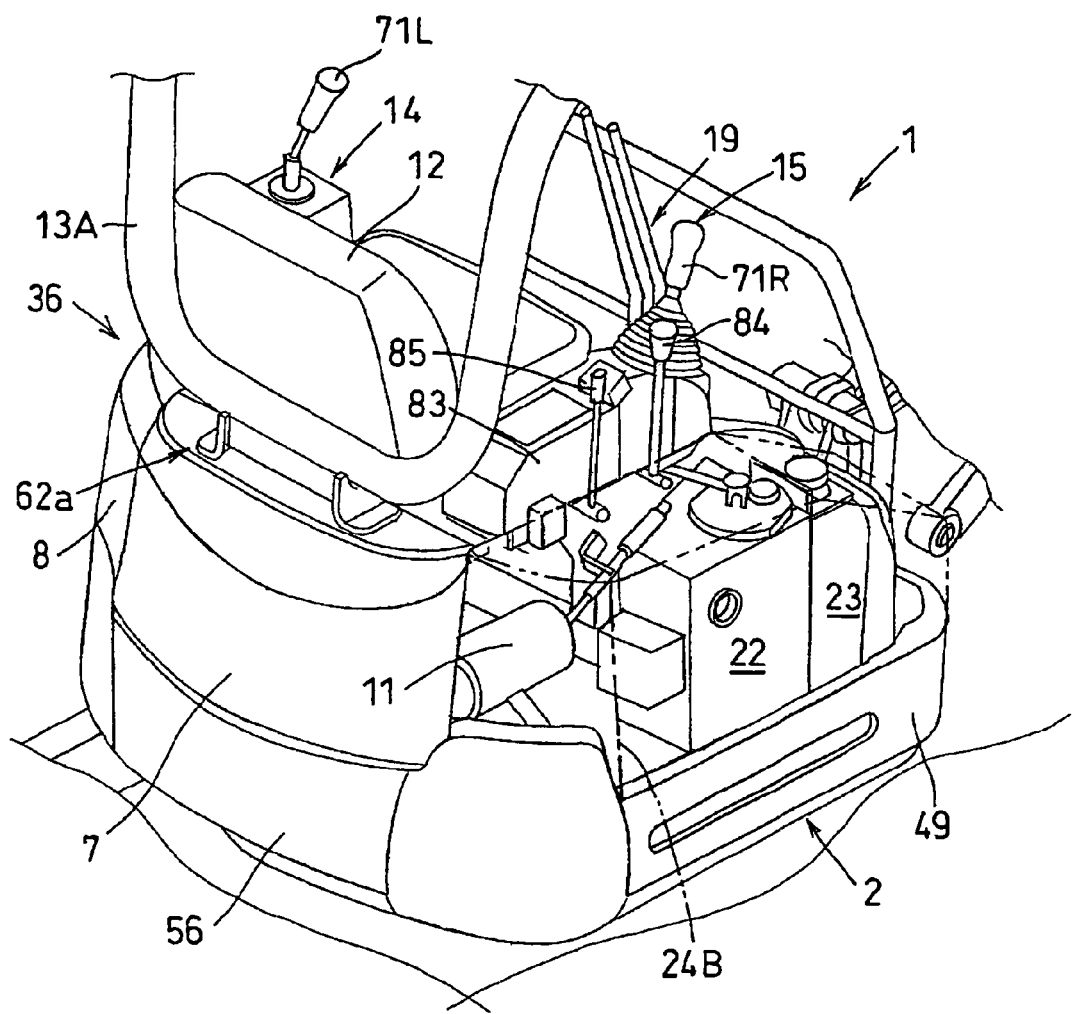
FIG. 4 is a right-rear perspective view of the upper structure.
Figure 5:
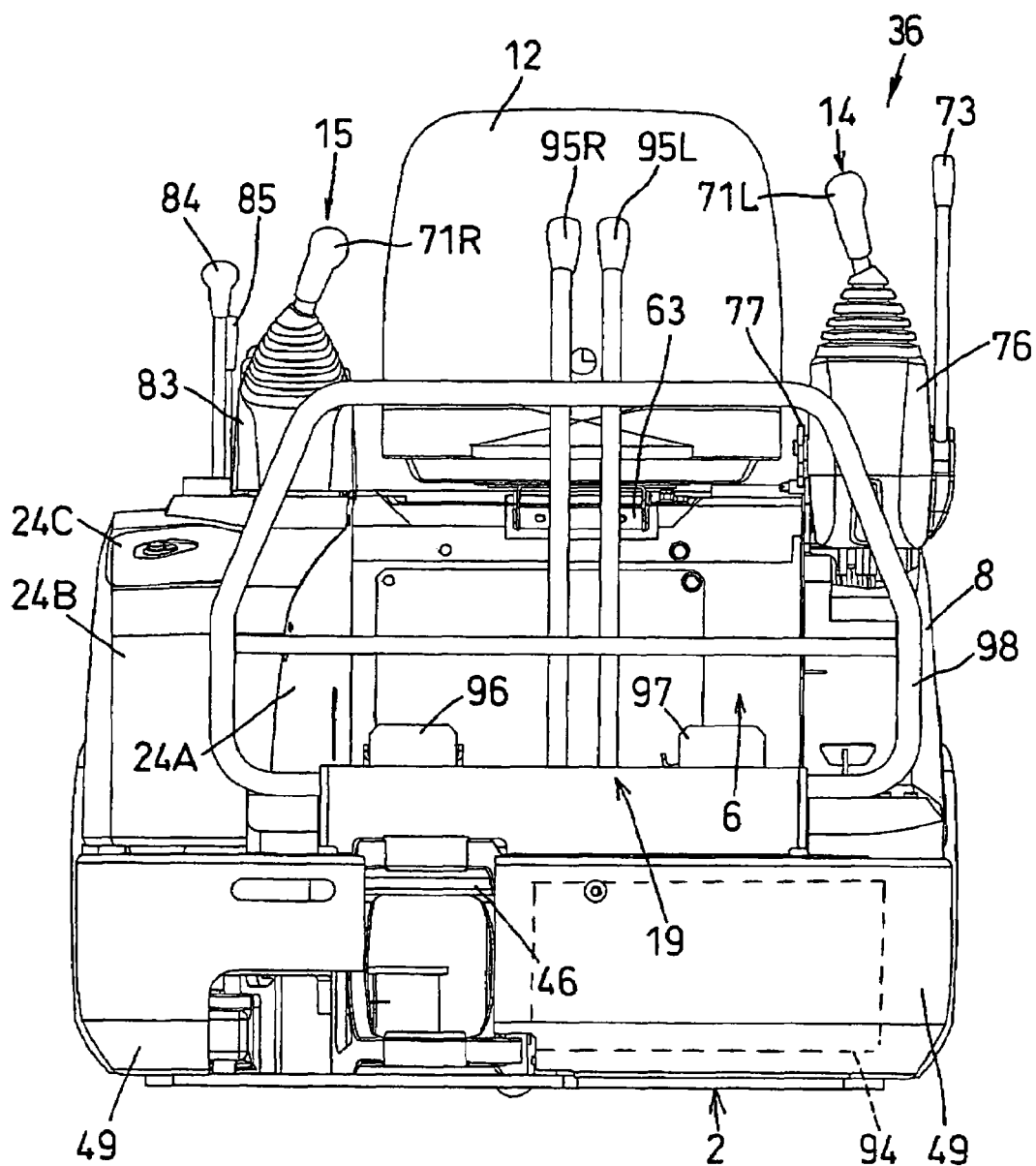
FIG. 5 is a front view of a swivel deck.
Figure 6:
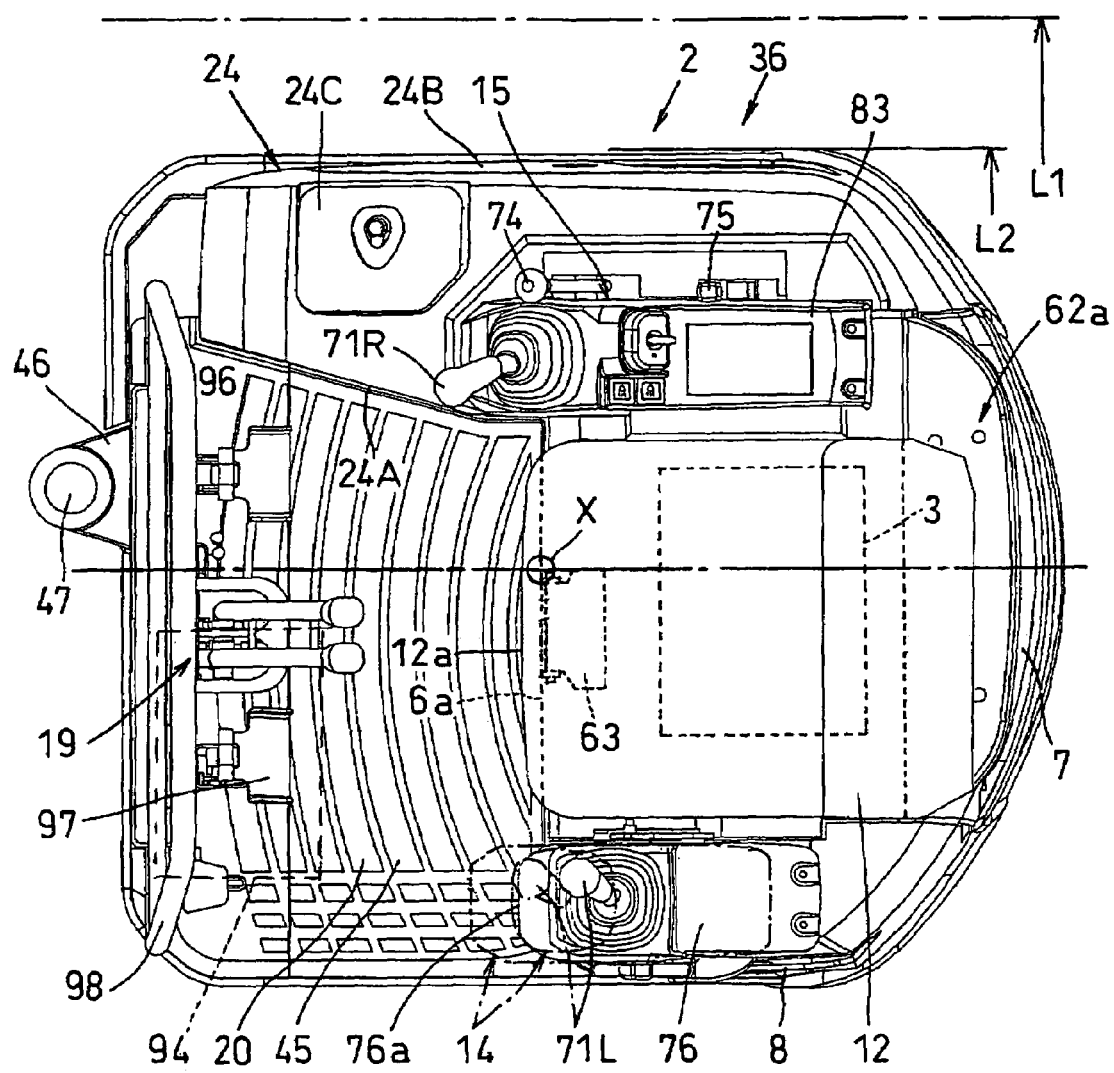
FIG. 6 is a plan view of the swivel deck.
Figure 7:
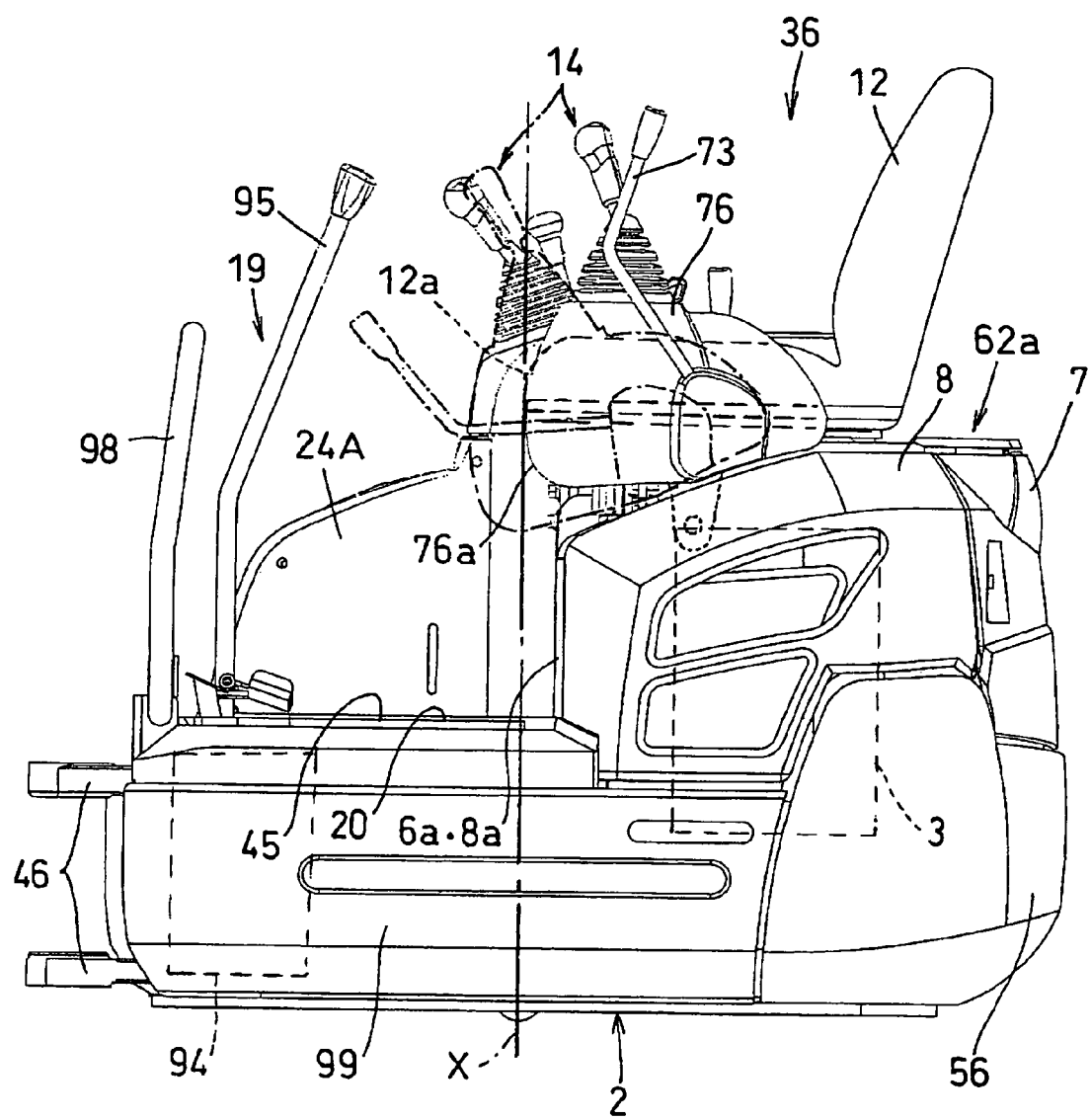
FIG. 7 is a left side view of the swivel deck.
Figure 8:
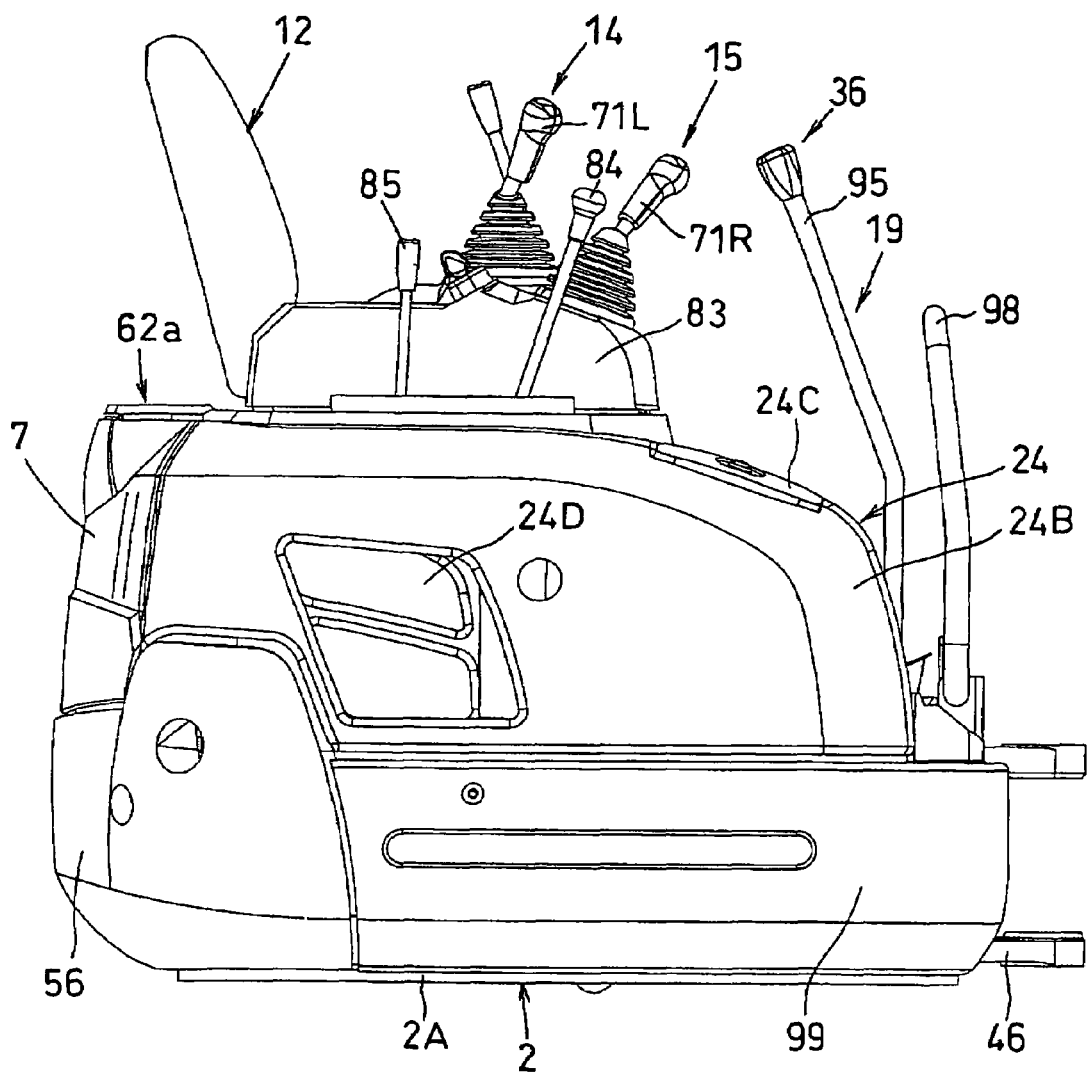
FIG. 8 is a right side view of the swivel deck.
Figure 9:
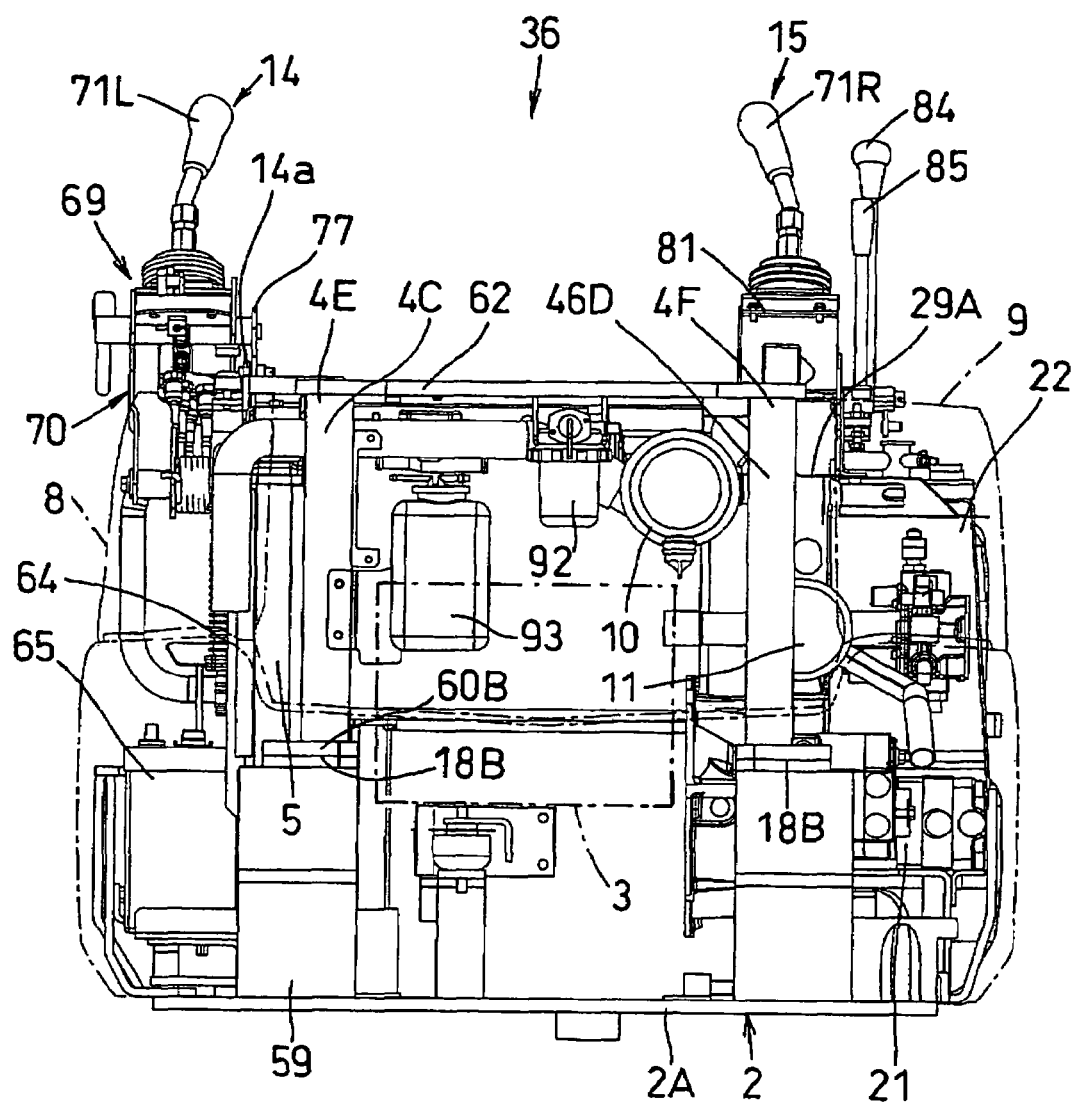
FIG. 9 is a rear view in section of the swivel deck.
Figure 10:
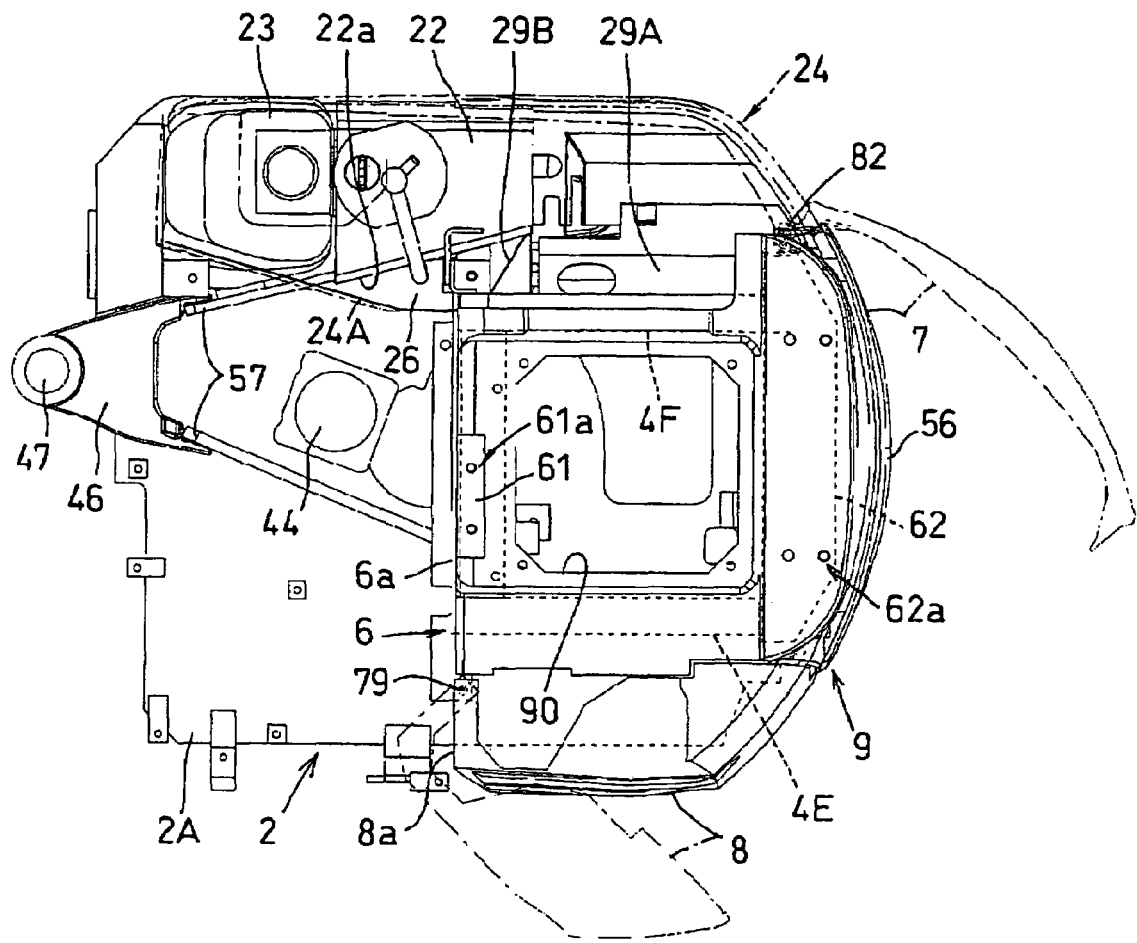
FIG. 10 is a plan view showing a cover unit of the swivel deck.
Figure 11:
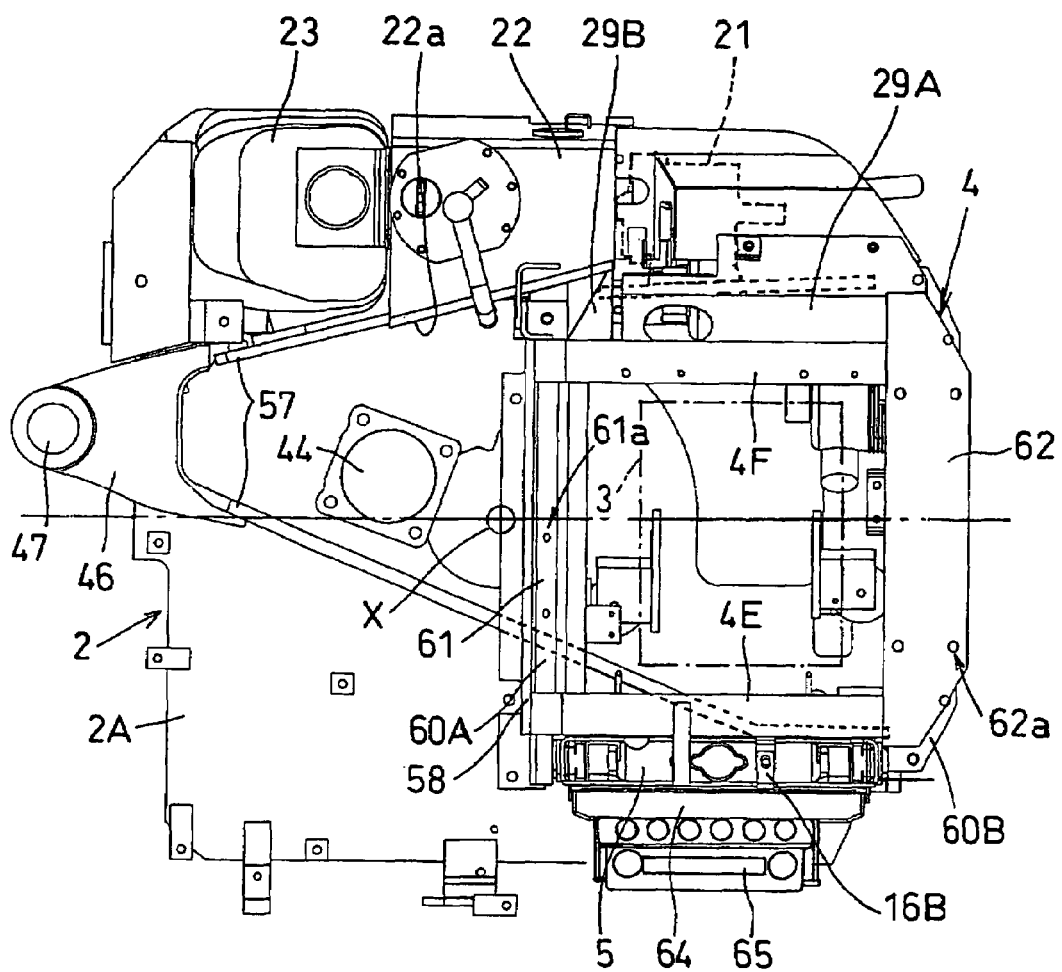
FIG. 11 is a plan view showing components mounted on the swivel deck.
Figure 12:
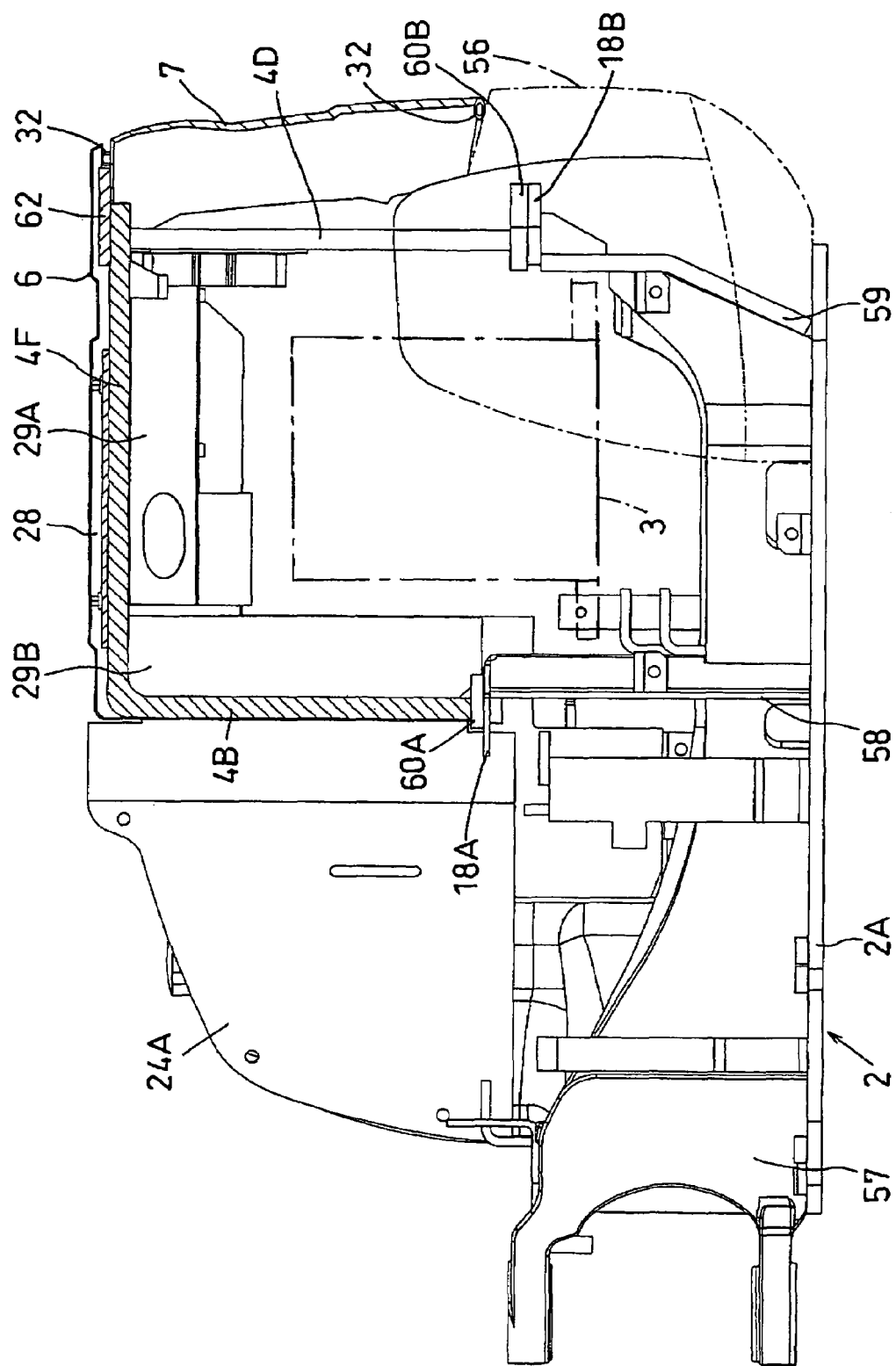
FIG. 12 is a side view in section showing an inner construction of the swivel deck.
Figure 13:
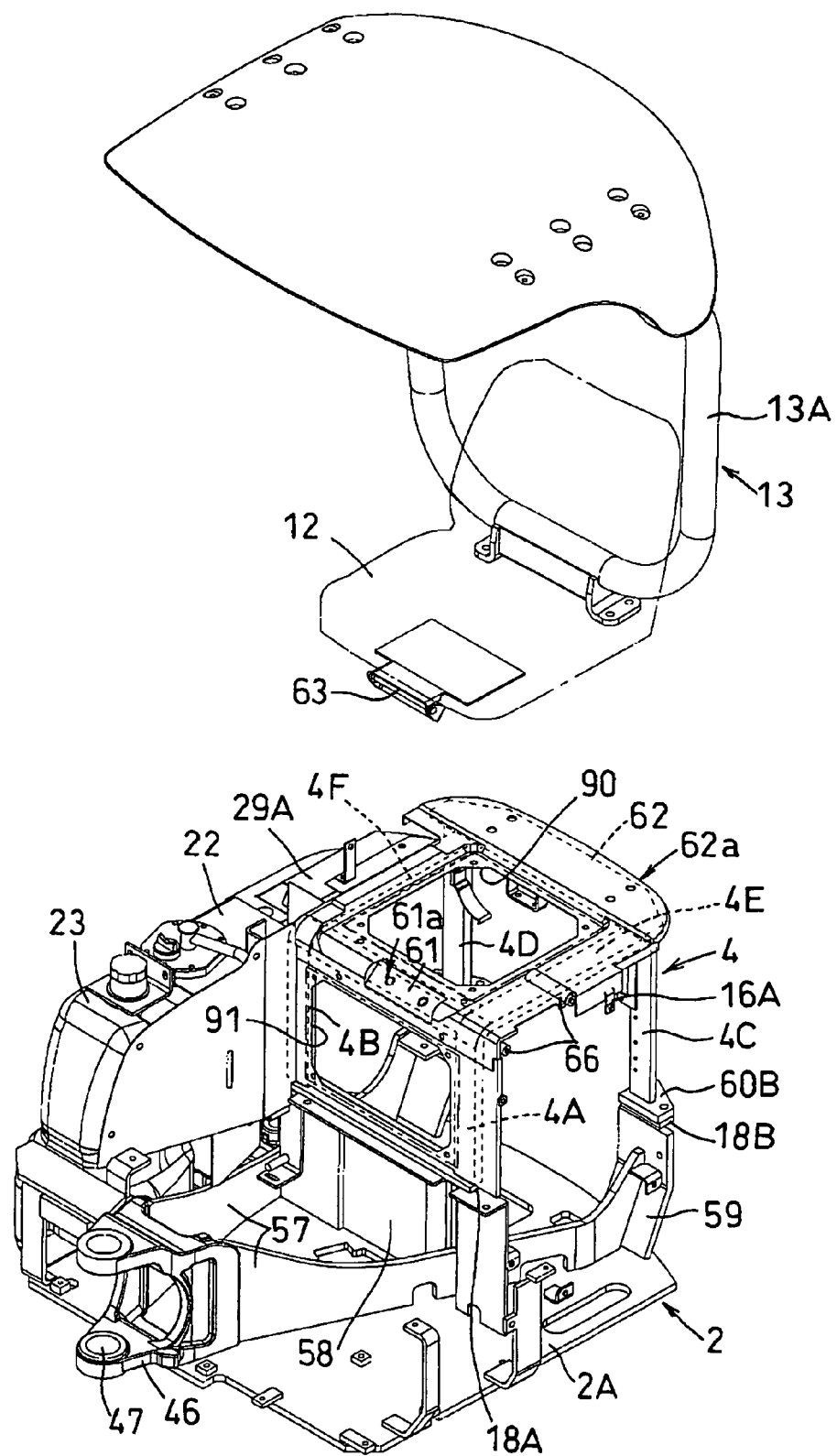
FIG. 13 is an exploded, left-front perspective view of mounting constructions of the swivel deck for mounting an operator's seat and a canopy.
Figure 14:
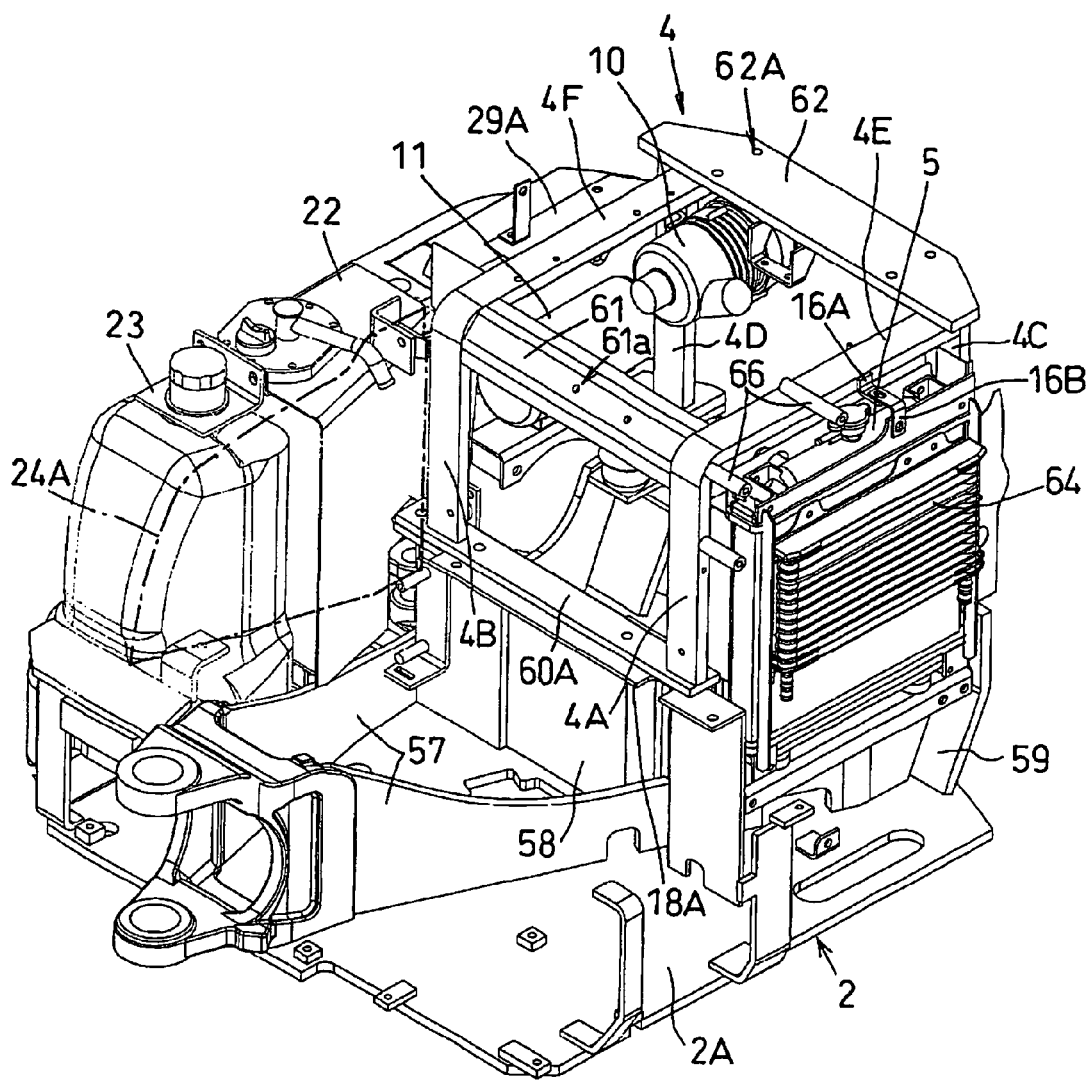
FIG. 14 is a perspective view showing the components mounted on the swivel deck.
Figure 15:
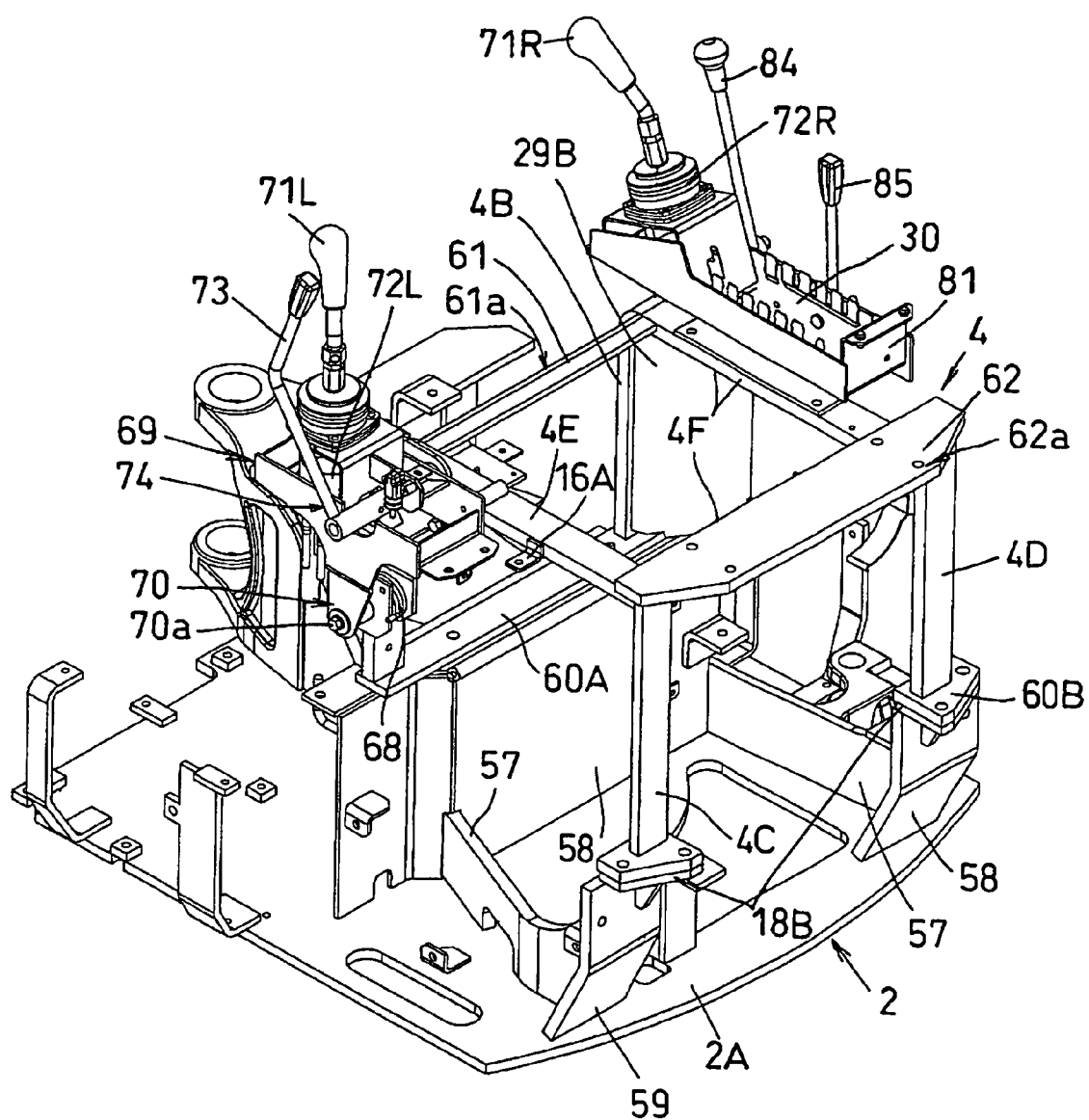
FIG. 15 is a perspective view showing relationship between a support frame and right and left implement controllers.
Figure 16:
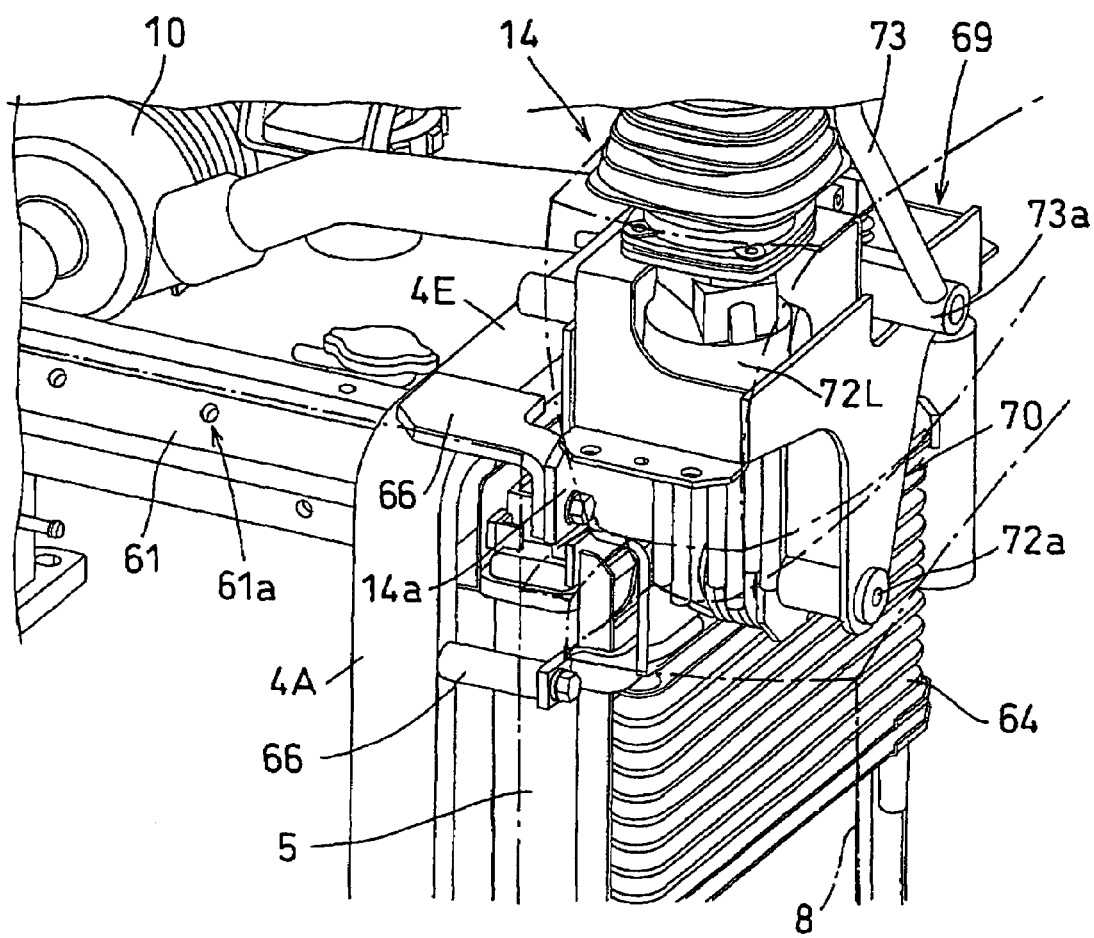
FIG. 16 is a left-front perspective view showing the left implement controller and its vicinity.
Figure 17:
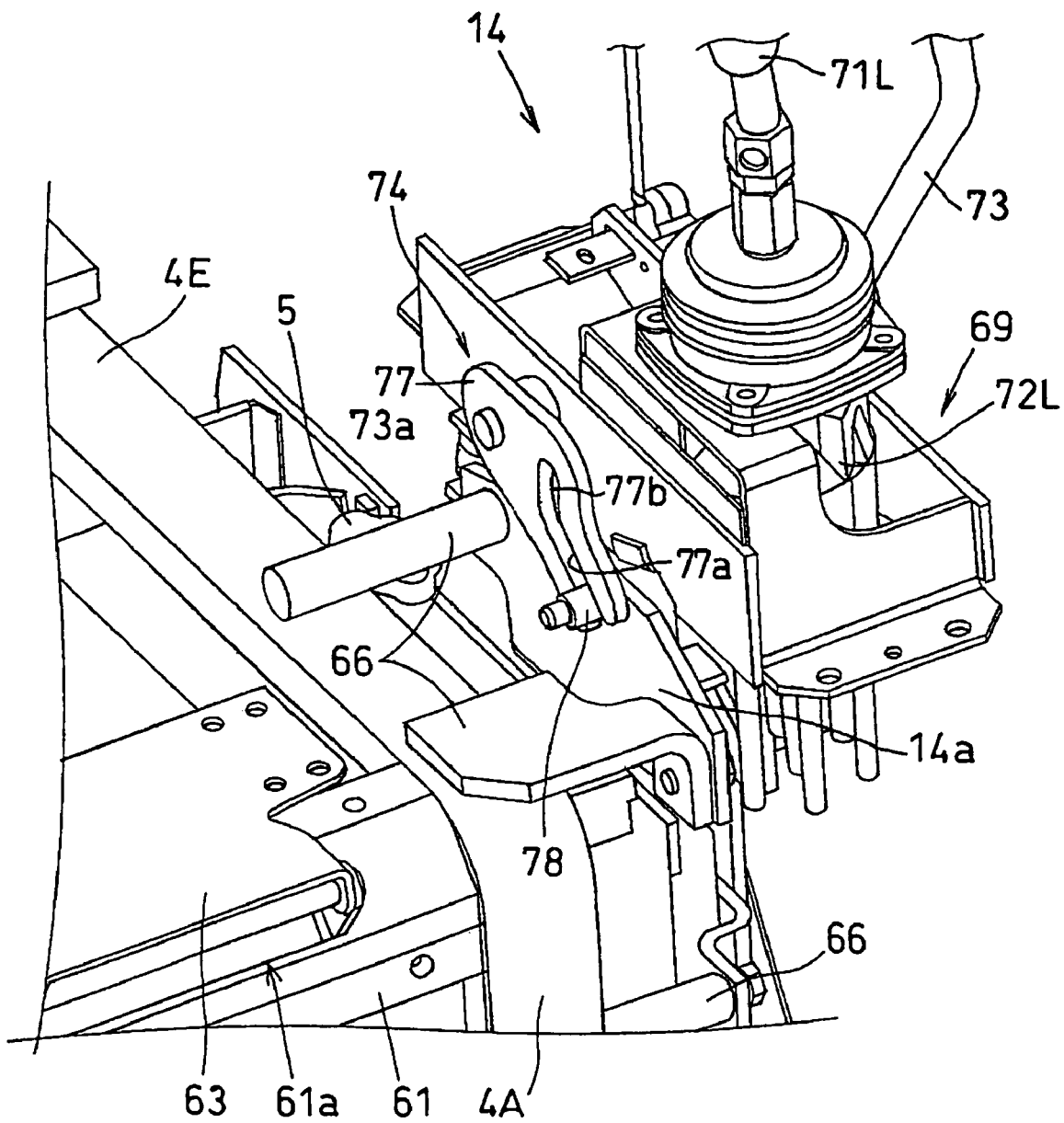
FIG. 17 is a right-front perspective view showing the left implement controller and its vicinity.
Figure 18:
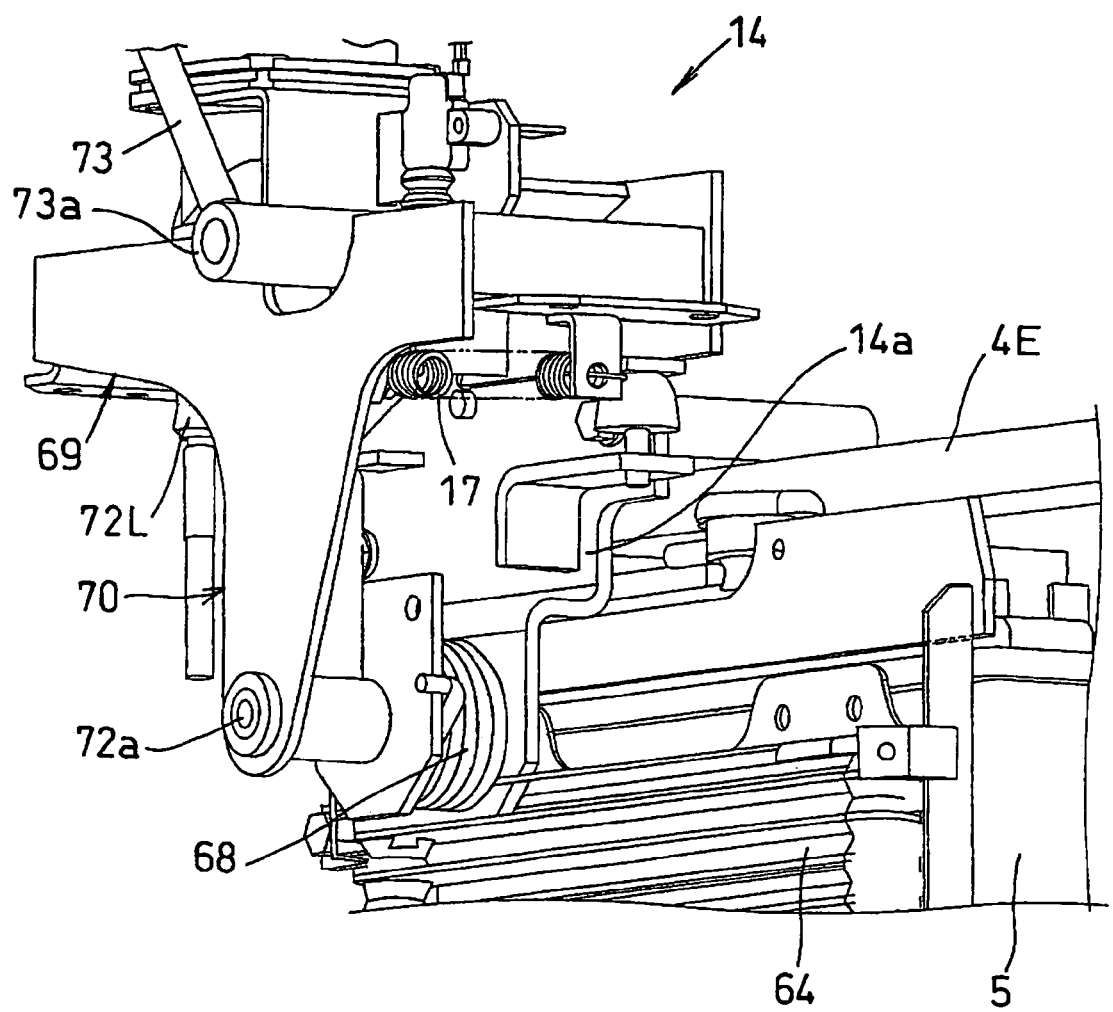
FIG. 18 is a left-rear perspective view showing the left implement controller and its vicinity.
Figure 19:
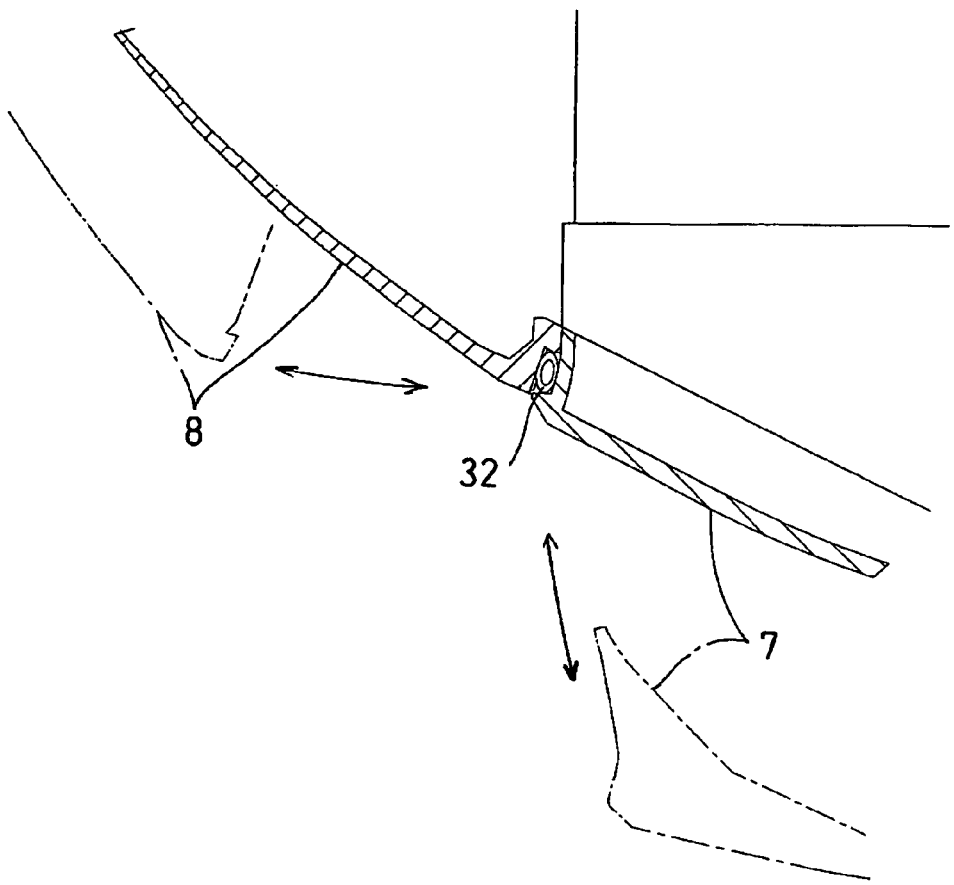
FIG. 19 is a plan view in section showing adjacent portions of a hood cover and a side cover.
Figure 20:
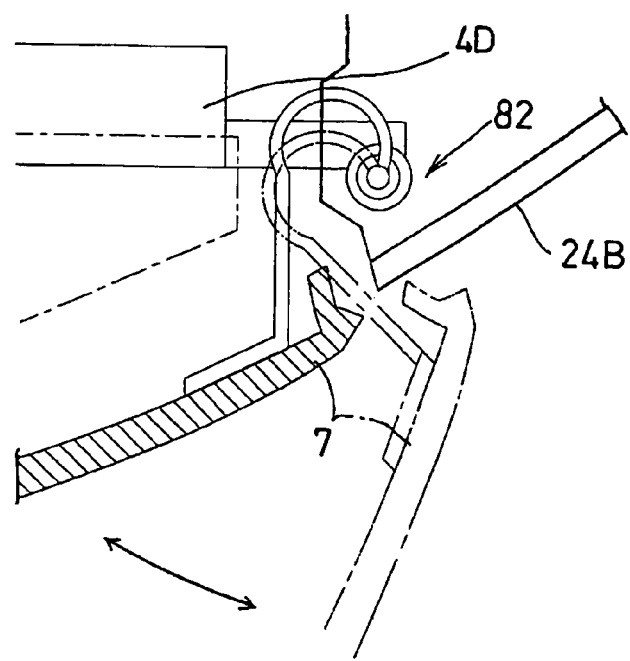
FIG. 20 is a plan view in section showing a pivot portion of the hood cover.
Figure 21:
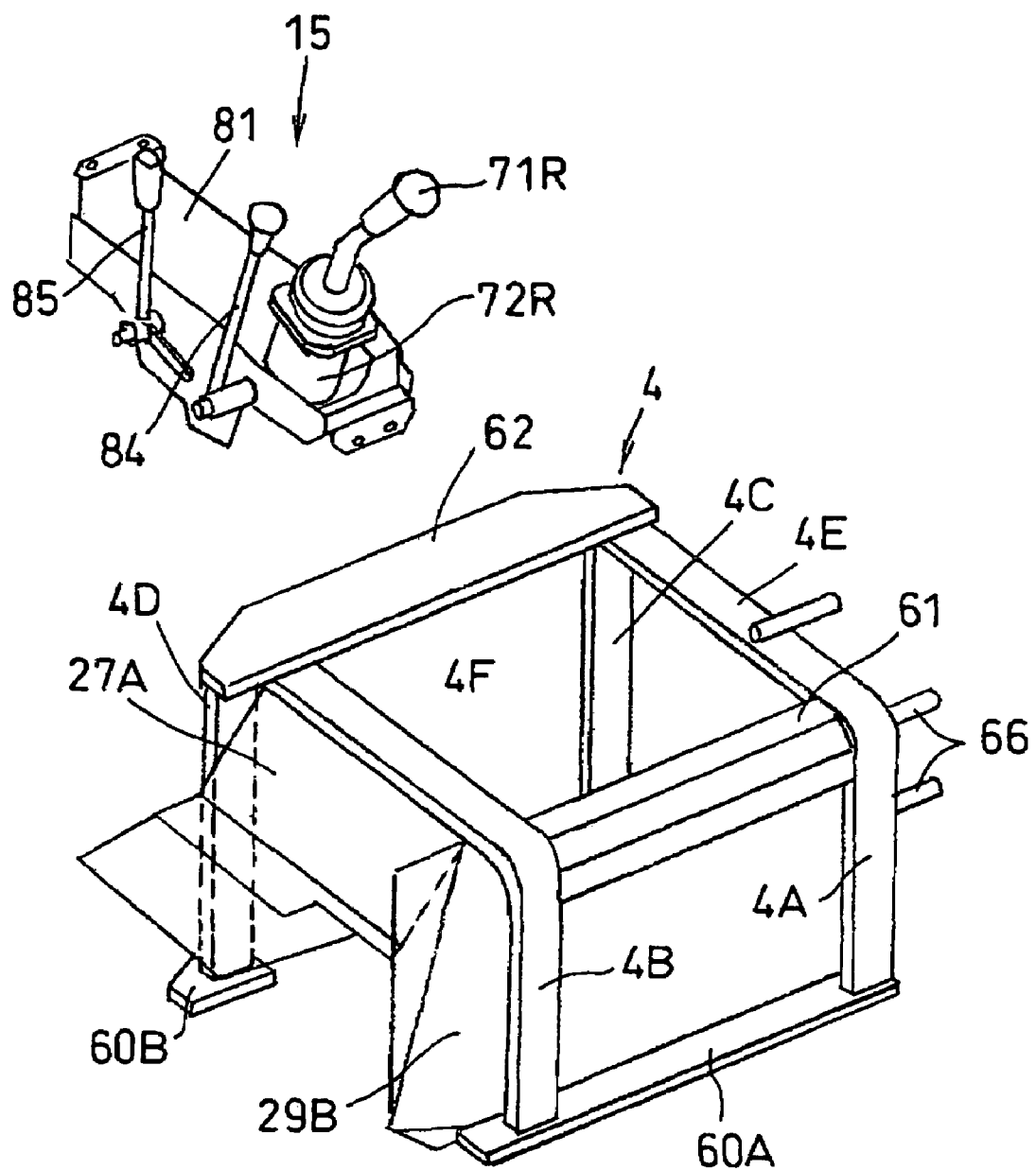
FIG. 21 is a perspective view of the support frame.
Figure 22:
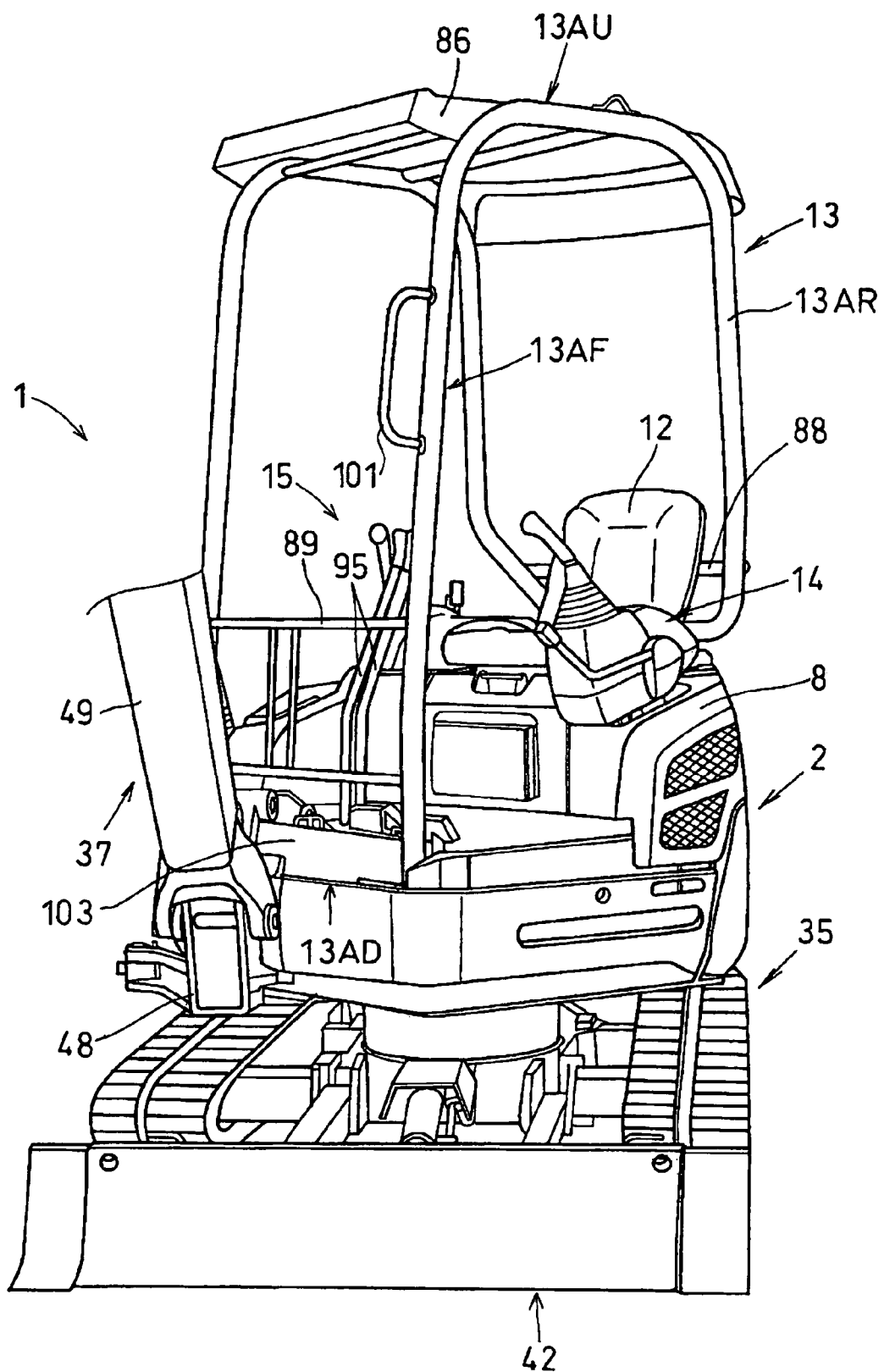
FIG. 22 is a perspective view of a swiveling work machine according to a second embodiment of the present invention, showing its operator's seat protector.
Figure 23:
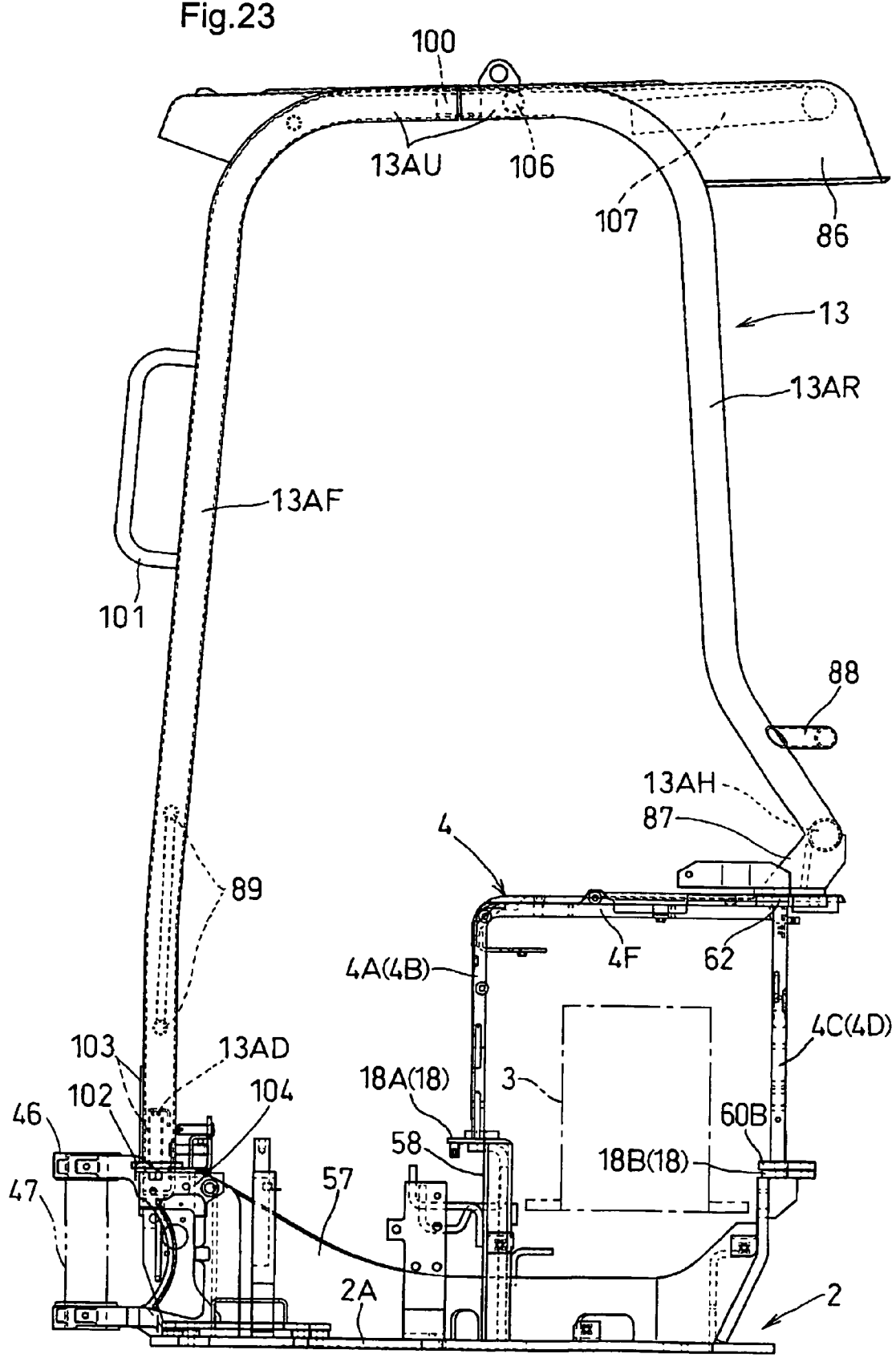
FIG. 23 is a side view of the operators seat protector shown in FIG. 22.
Figure 24:
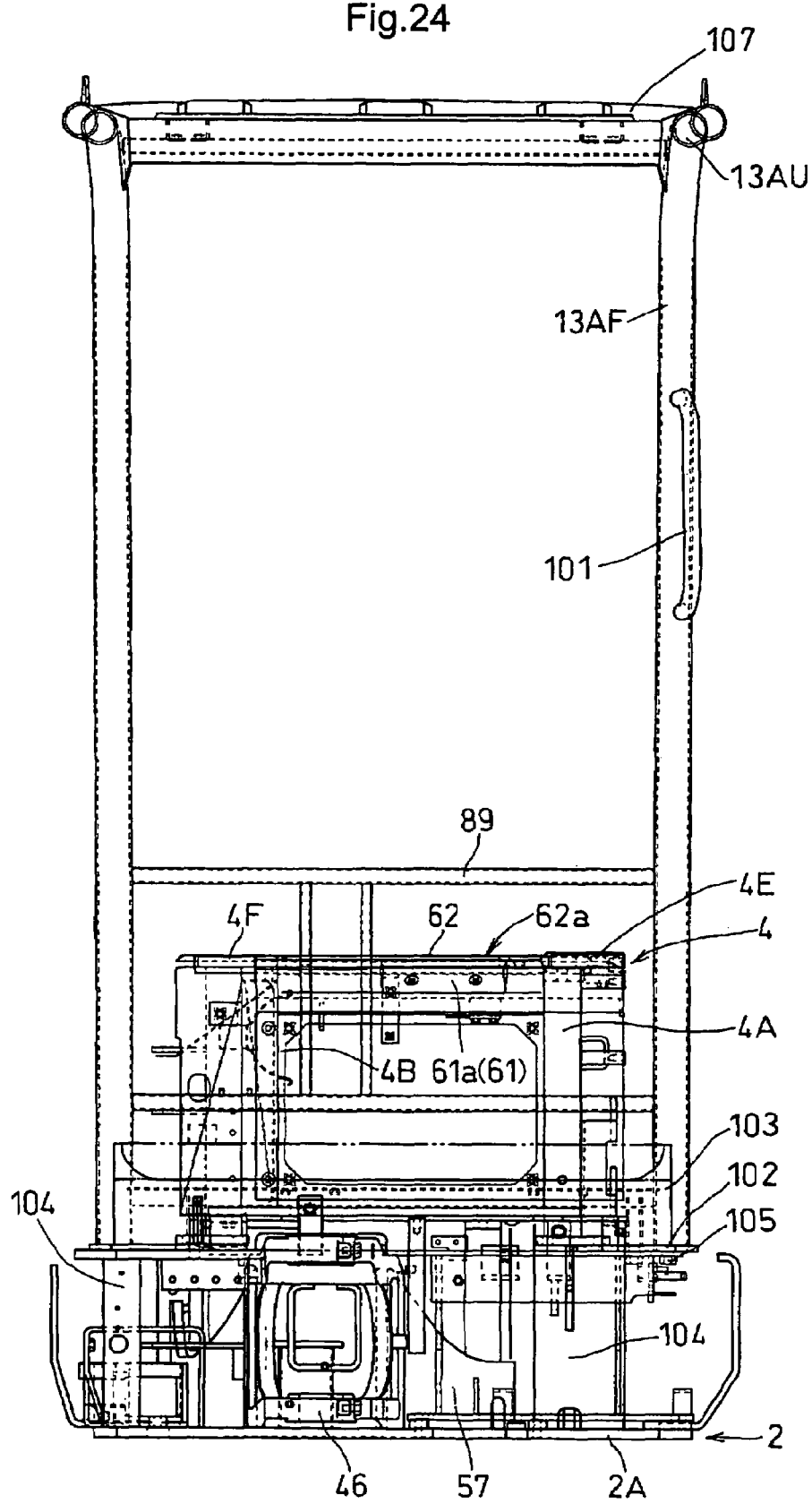
FIG. 24 is a front view of the operator's seat protector.
Figure 25:
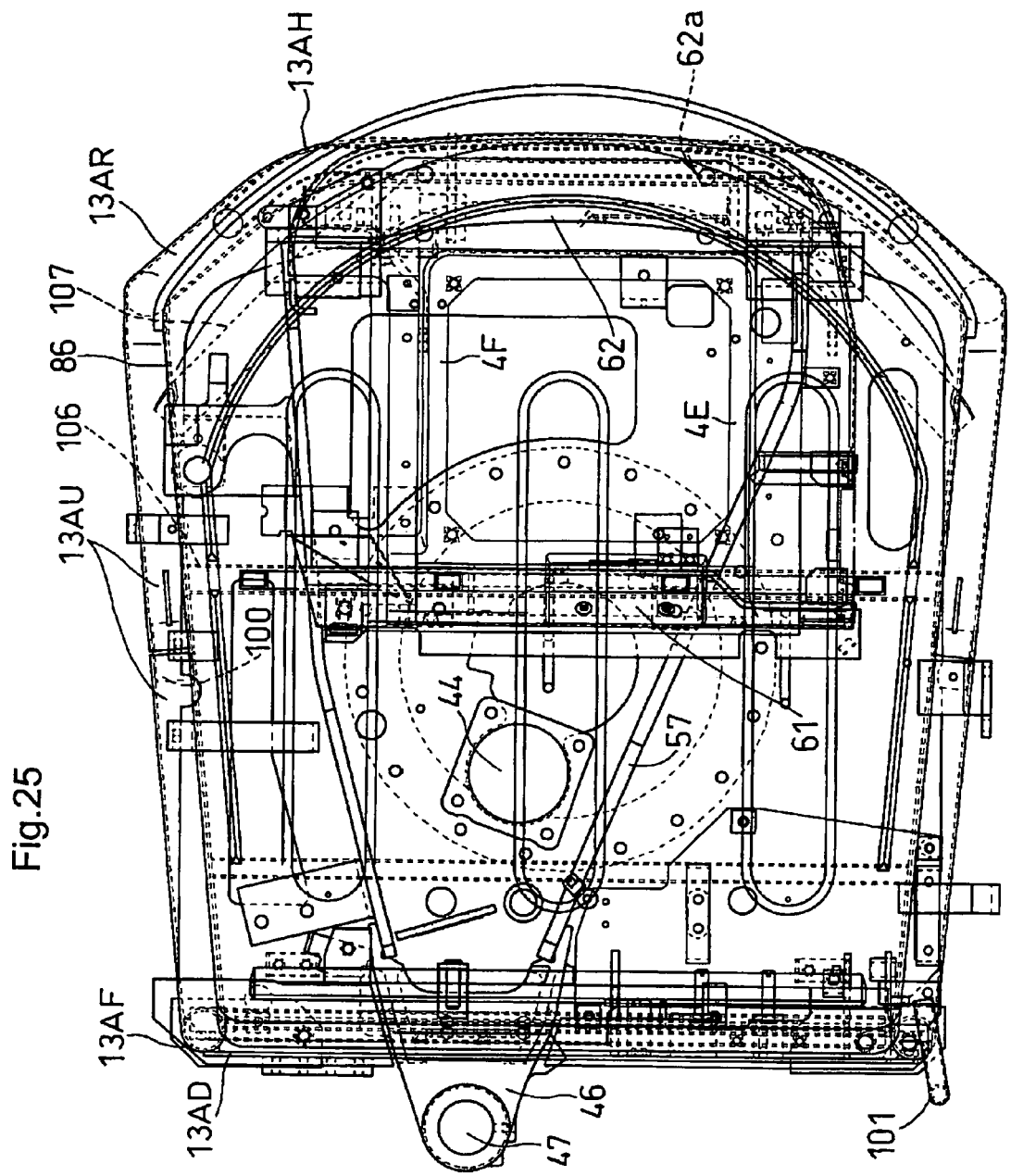
FIG. 25 is a plan view of the operator's seat protector.
Figure 26:
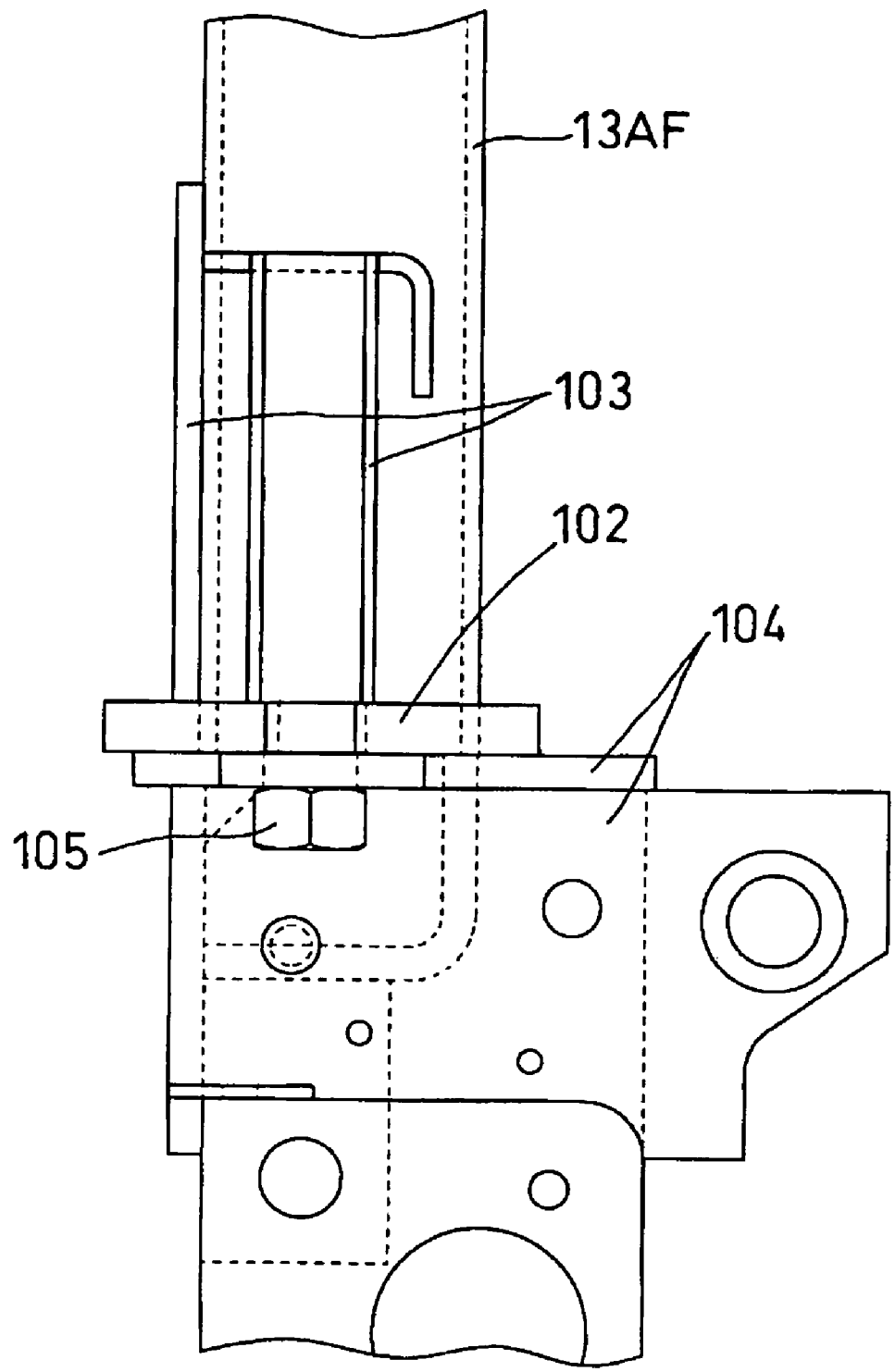
FIG. 26 is an enlarged view of principal portions, showing an attachment construction for the operator's seat protector.

The hood cover 7 is pivoted at its right end to the support frame 4 and the side cover 8 is pivoted at its front face to the support frame 4, respectively. That is to say, these covers can be pivotally opened in biparting manner via the respective vertical shafts on the adjacent side and on the opposite side. Therefore, by opening these covers in the biparting manner as shown in FIG. 3, the rear portions of the engine 3 and the radiator 5, the side portions and upper portions of the radiator 5, the oil cooler 64 and the battery 64 can be exposed, so that maintenance operations of the engine 3 and most of other vehicle components present inside the engine room can be carried out easily.

Further, as the hood cover 7 is constructed as a horizontally open type, this cover can be opened wide without being interfered with by the operator's seat protector 13 disposed upwardly of this cover. Also, this hood cover 7 can be opened independently of the side cover 8, i.e. without necessitating simultaneous opening of the side cover 8.

On the right side of the engine 3, there is disposed the hydraulic pump 21 to which the rotational power is transmitted from the crank shaft of the engine 3. Forwardly of this hydraulic pump 21, there is disposed the working fluid tank 22 and forwardly of this working fluid tank 22, the fuel tank 23 is disposed.

On the right side portion 4F of the support frame 4 and upwardly of the upper wind guide plate 29A, there is provided a box 81 of the right implement controller 15. At a front portion of this box 81, there is provided a pilot valve 72R having a right control lever 71R. The right side face of the box supports two control levers 84, 85 and at a rear portion of the box, an electric unit 30 is accommodated. Hence, adverse effect of the hot air current to the electric unit 30 is avoided by means of the upper wind guide plate 29A which guides the hot air from inside the engine room to the outside. Numeral 83 denotes a box cover for the box 81.

The working fluid tank 22 and the fuel tank 23 are disposed on the right side of the operator's seat 12 and are covered with a tank cover 24. The front wind guide plate 29B is disposed rearwardly of the working fluid tank 22 for avoiding adverse effect of the hot air current to the working fluid tank 22.

The tank cover 24 includes an inner wall plate (side wall) 24A on the side of the operator's access step 45 and an outer cover 24B for covering upper and right side faces of the working fluid tank 22 and the fuel tank 23 and the front face of the fuel tank 23.

The inner wall plate 24A is affixed to the base plate 2A and the right post portion 4B of the support frame 4 or the right end of the fixed cover 6 and is disposed to project forwardly from the support frame 4, so as to cover the left side faces of the working fluid tank 22 and the fuel tank 23.

The outer cover 24B covers the upper faces, the right side faces and the front and rear faces of the working fluid tank 22 and the fuel tank 23. This cover 24B defines a fuel inlet opening at a position corresponding to an upper portion of the fuel tank 23, which is closed with a lid 24C. The outer cover 24b defines, at a right side portion thereof, a multiple-aperture type air exhaust portion 24D.

The faces of the inner wall plate 24A and the fuel tank 23 on the side of the operator's access step 45 are inclined to the right side as extending forwardly, so that the front space above the operator's access step 45 is formed large for facilitating the operator's operation of the traveling controller 19.

Further, a side face 22a of the working fluid tank 22 on the side of the operator's access step 45 is inclined to the right side as extending rearward, so as to form, between the inner wall plate 24A and the support frame 4, a substantially triangular space 26 (shown in FIG. 10) extending wider rearward. Within this space 26, hydraulic pipes and/or harnesses are arranged. With this concentrated arrangement of these components, the pipe arranging operation and maintenance operation are facilitated.

At a front upper portion of the base plate 2A of the swivel deck 2, there is mounted a control valve assembly 94 comprising a plurality of valves connected to each other along the right/left direction. The perimeter of the base plate 2A is covered with a side cover 99. And, the operator's access step 45 disposed upwardly thereof is formed by attaching a step plate on the base plate 2A and then disposing a mat on the top surface of the step plate.

The traveling controller 19 mounted at the front portion of the swivel deck 2 includes right and left traveling control levers 95L, 95R and various control pedals disposed at the feet of these levers, including a service port pedal 96, a swing pedal 97, etc. Further, a front handrail 98 is provided forwardly of these pedals.

Second Embodiment

FIGS. 22-26 show a second embodiment of a backhoe (an example of "swiveling work machine") 1 relating to the present invention. The principal difference from the foregoing first embodiment lies in the construction of the operator's seat protector 13. Therefore, the following discussion is focused on this construction.

That is, the operator's seat protector 13 in this embodiment is constructed as a four-post type having right and left front post portions 13AF and right and left rear post portions 13AR. The right and left rear post portions 13AR are attached to the attaching portion 62a of the support frame 4, whereas the right and left front post portions 13AF are attached to the right and left front portions of the swivel deck 2.

More particularly, this operator's seat protector 13 includes the right and left front post portions 13AF, the right and left rear post portions 13AR, a pair of right and left upper beam portions 13AU which connect upper ends of the right and left front post portions 13AF with upper ends of the right and left rear post portions 13AR and mount a roof member 86 thereon, a front lower connecting portion 13AD for connecting lower portions of the right and left front post portions 13AF, and a rear lower connecting portion 13AH for connecting lower portions of the right and left rear post portions 13AR.

In this operator's seat protector 13, the rear lower connecting portion 13AH, the right and left rear post portions 13AR and respective latter halves of the right and left upper beam portions 13AU are formed by bending a single pipe. A former half of each right/left upper beam portion 13AU and each right/left front post portion 13AF are formed of a single pipe, respectively. And, the former half and the latter half of each right/left upper beam portion 13AF is connected via a connecting member 100 formed of e.g. a round bar.

That is, in the rear half portion of the operator's seat protector 13, at a center portion of the single pipe, the rear lower connecting portion 13AH is formed, and from opposed ends of this rear connecting portion 13AH, the pipes extend with a forward upward inclination to form the lower portions of the right and left rear post portions 13AR. Then, the pipes are bent with substantially straight upward inclination from the upper ends of the lower portions of the right and left rear post portions 13AR to form the upper portions of the right and left rear post portions 13AR. Then, from these upper ends of the right and left rear post portions 13AR, the pipes are bent forwardly to form the latter halves of the right and left upper beam portions 13AU. Hence, this rear frame structure portion of the operator's seat protector 13 is formed without any welded portions, hence, effectively avoiding concentrated or local stress application.

Further, in the front half portion of the operator's seat protector 13, from the former halves of the right and left upper beam portions 13AU, the upper portions of the right and left front post portions 13AF extend with a slightly forward and downward inclination. And, lower portions of the right and left front post portions 13AF are formed substantially vertical. And, the former half of each right/left upper beam portion 13AU and the right/left front post portion 13AF corresponding therewith are formed of a pipe. And, these pipes are connected to each other via the front lower connecting portion 13AD to be integral with each other. Hence, the front portion of the operator's seat protector 13 too can be manufactured easily.

As described above, the front half portion and the rear half portion of each right/left upper beam portion 13AU is connected to each other by the insertion of the connecting member 100 therebetween. In this, the front half portion and the rear half portion of the upper beam portion 13AU may be welded respectively to the connecting member 100. Instead, these portions may be detachably connected to each other with insertion of a pin, so that the operator's seat protector may be disassembled along the fore and aft direction.

At the rear lower connecting portion 13AH, there is provided an attaching bracket 87 to be attached to the attaching portion 62a of the support frame 4. When the attaching bracket 87 is attached to the attaching portion 62a, the lower portions of the rear post portions 13AR are located upwardly and rearwardly of the engine 3 and their vertical intermediate portions are located laterally of the operator's seat 12. In this way, the sturdy support of the operator's seat protector 13 by the support frame 4, the compact arrangement of the upper structure of the swivel deck 2, the protection of the operator's seat 12 and the co-utilization of the construction as a handrail for the operator to be seated at the operator's seat 12 can be achieved.

At the lower portions of the forwardly upwardly inclined right and left rear post portions 13AR, there is provided a rear connecting member 88 having an arcuate shape in plan view and connecting the right and left sides. This rear connecting member 88 provides protection to the rear face of the operator's seat 12. The rear ends of this back connecting member 88, the rear lower connecting portion 13AH and the room member 86 are substantially aligned with each other in the fore and aft direction, thus forming the rearmost portion of the upper section of the implement attaching unit.

At vertically intermediate portions of the right and left front post portions 13AF, there are connected a pair of upper and lower front connecting members 89 forming front handrails. These upper and lower front connecting members 89 are also connected to each other via vertical members. On the left front post portion 13AF, an upper handrail 101 is attached.

The lower ends of the right and left front post portions 13AF are connected via the front lower connecting portion 13AD as described above. This front lower connecting portion 13AD includes a pair of lower flat plates 102 affixed to the lower ends of the right and left front post portions 13AF and a vertical plate 103 affixed to upper faces of the right and left lower flat plates 102 and the side faces of the right and left front post portions 13AF. The lower flat plates 102 are mounted on a plurality of attaching bases 104 formed erect at the front end of the base plate 2A and the upper face of the receiving bracket 46, etc. Then, as the right and left lower flat plates 102 and the attaching bases 104 are fastened together by means of bolts 105, the front portion of the operator's seat protector 13 is detachably fixed to the swivel deck 2.

The right and left upper beam portions 13AU are connected to each other at front and intermediate portions thereof by means of a plurality of front and rear upper connecting members 106 and connected also at the rear portions thereof by means of an upper rear connecting member 107. This upper rear connecting member 107 has an arcuate shape similar to the rear portion of the roof member 86 projecting rearwardly from the right and left upper beam portions 13AU. The roof member 86 is supported to the right and left upper beam portions 13AU and the upper rear connecting member 107 and is bolt-attached to the upper connecting member 106.

The upper connecting member 106, the upper rear connecting member 107, the upper handrail 101, the front connecting member 89, the rear connecting member 88, etc. are all formed of pipes or round bars.

The rest of the construction of this embodiment is identical to that of the first embodiment. Therefore, description thereof is omitted.

Other Embodiments

The shapes and positional relationships in the fore and aft direction, right/left direction and vertical direction of the respective members and components used in the foregoing embodiments are best when constructed as shown in FIGS. 1-26. However, the invention is not limited thereto. Various modifications of these members and their constructions or combinations thereof would be possible for one skilled in the art.

For instance, the swiveling work machine 1 can be constructed as a super-small swiveling type having a boom pivoted at the center of the swivel deck 2. The swivel deck 2 and the components and devices mounted thereon can be reversed in their positions in the right/left direction.

The support frame 4 can be constructed as a five-post type or a different four-post type having a non-rectangular shape in its plan view (e.g. a trapezoidal shape in plan view).

The hood cover 7 may be constructed as an upper pivotal type. The side cover 8 may be constructed as a rear-end pivotal type or even as a detachable type.

Moreover, the rear lower connecting portion 13AH, the right and left rear post portions 13AR, the upper beam portions 13AU and the right and left front post portions 13AF may be formed of separate members which are to be welded one after another. Further, the operator's seat protector 13 may be utilized as a framework for the cabin.

The invention claimed is:

1. A swiveling work machine comprising:
  a swivel deck;
  an engine and an operator's seat which are mounted on the swivel deck; and
  a protector for the operator's seat mounted erect on the swivel deck;
  wherein the swivel deck mounts, at a rear portion thereof, a support frame having four post portions disposed around the engine;
  two rear post portions of the support frame have upper ends thereof connected via a rear beam member;
  said rear beam member includes an attaching portion for the operator's seat protector to which portion the protector is attached;
  the support frame includes, at a front upper portion thereof an attaching portion for the operator's seat to which portion the operator's seat is attached;
  the operator's seat protector is constructed as a four-post type having right and left front post portions and right and left rear post portions, with the right and left rear support post portions being attached to said attaching portion, said right and left front post portions being attached to right and left front portions of the swivel deck, a pair of right and left upper beam portions connect upper ends of said respective front post portions with upper ends of said respective rear post portions and mount a roof member thereon, a front lower connecting portion for connecting lower portions of the right and left front post portions, and a rear lower connecting portion for connecting lower portions of the right and left rear post portions; and
  at said rear lower connecting portion, there is provided an attaching bracket to be attached to said attaching portion.

2. The swiveling work vehicle according to claim 1, wherein said rear lower connecting portion, the right and left rear post portions and respective latter halves of the right and left upper beam portions of the operator's seat protector are formed by bending a single pipe;
  a former half of said each upper beam portion and said each front post portion are formed of a single pipe, respectively; and
  the former half and the latter half of said each upper beam portion is connected via a connecting member.

3. The swiveling work vehicle according to claim 2, wherein the operator's seat is mounted at an upper portion of the support frame;
  said rear lower connecting portion of the operator's seat protector is disposed rearwardly of the operator's seat; and
  a lower portion of at least one of the rear post portions extends from the rear side of the driver's seat to a lateral side thereof.

4. The swiveling work vehicle according to claim 1, wherein a radiator is disposed on either right or left side of the support frame;
  an air cleaner and a muffler are mounted inside the support frame; and
  the swivel deck includes a support portion to which the support frame is detachably attached from above the engine.

5. The swiveling work vehicle according to claim 1, wherein the support frame includes, at right and left upper portions thereof, attaching portions for right and left implement controllers.

6. The swiveling work vehicle according to claim 5, wherein the support frame includes a support stay projecting from a lateral upper portion thereof to be connected with an upper portion of the radiator.

7. A swiveling work machine comprising:
  a swivel deck;
  an engine and an operator's seat which are mounted on the swivel deck; and
  a protector for the operator's seat mounted erect on the swivel deck;
  wherein the swivel deck mounts, at a rear portion thereof, a support frame having four post portions disposed around the engine;
  two rear post portions of the support frame have upper ends thereof connected via a rear beam member;
  said rear beam member includes an attaching portion for the operator's seat protector to which portion the protector is attached;
  the support frame includes, at right and left upper portions thereof, attaching portions for right and left implement controllers;
  the operator's seat protector is constructed as a four-post type having right and left front post portions and right and left rear post portions, with the right and left rear support post portions being attached to said attaching portion, said right and left front post portions being attached to right and left front portions of the swivel deck, a pair of right and left upper beam portions connect upper ends of said respective front post portions with upper ends of said respective rear post portions and mount a roof member thereon, a front lower connecting portion for connecting lower portions of the right and left front post portions, and a rear lower connecting portion for connecting lower portions of the right and left rear post portions; and at said rear lower connecting portion, there is provided an attaching bracket to be attached to said attaching portion.

8. The swiveling work vehicle according to claim 7, wherein said rear lower connecting portion, the right and left rear post portions and respective latter halves of the right and left upper beam portions of the operator's seat protector are formed by bending a single pipe;

a former half of said each upper beam portion and said each front post portion are formed of a single pipe, respectively; and the former half and the latter half of said each upper beam portion is connected via a connecting member.

9. The swiveling work vehicle according to claim 8, wherein the operator's seat is mounted at an upper portion of the support frame;

said rear lower connecting portion of the operator's seat protector is disposed rearwardly of the operator's seat; and a lower portion of at least one of the rear post portions extends from the rear side of the driver's seat to a lateral side thereof.

10. The swiveling work vehicle according to claim 7, wherein a radiator is disposed on either right or left side of the support frame;

an air cleaner and a muffler are mounted inside the support frame; and the swivel deck includes a support portion to which the support frame is detachably attached from above the engine.

11. The swiveling work vehicle according to claim 7, wherein the support frame includes, at a front upper portion thereof, an attaching portion for the operator's seat and includes also, at a rear upper portion thereof, said attaching portion for the operator's seat protector.

12. The swiveling work vehicle according to claim 7, wherein the support frame includes a support stay projecting from a lateral upper portion thereof to be connected with an upper portion of the radiator.

* * * * *